(12) United States Patent
Gong

(10) Patent No.: US 11,182,190 B2
(45) Date of Patent: Nov. 23, 2021

(54) DATA TRANSMISSION METHOD AND APPARATUS

(71) Applicant: HUAWEI TECHNOLOGIES CO., LTD., Guangdong (CN)

(72) Inventor: Lei Gong, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 160 days.

(21) Appl. No.: 16/214,551

(22) Filed: Dec. 10, 2018

(65) Prior Publication Data
US 2019/0114197 A1   Apr. 18, 2019

Related U.S. Application Data

(63) Continuation of application No. PCT/CN2017/087890, filed on Jun. 12, 2017.

(30) Foreign Application Priority Data

Jun. 15, 2016 (CN) .......................... 201610428164.3

(51) Int. Cl.
*G06F 9/455* (2018.01)
(52) U.S. Cl.
CPC .............. *G06F 9/45558* (2013.01); *G06F 2009/45579* (2013.01); *G06F 2009/45595* (2013.01)
(58) Field of Classification Search
CPC ....... G06F 2009/45579; G06F 9/45558; G06F 2009/45583; G06F 2009/45595
See application file for complete search history.

(56) References Cited

U.S. PATENT DOCUMENTS 9,838,277 B2 * 12/2017 Raney .................. H04L 43/028
2004/0012600 A1    1/2004 Deering et al.
(Continued)

FOREIGN PATENT DOCUMENTS

CN         1656465 A       8/2005
CN       103428582 A      12/2013
(Continued)

OTHER PUBLICATIONS

Pinto et al;"A zero-copy shared memory framework for host-guest data sharing in KVM";8 pages; (Year: 2016).*
(Continued)

*Primary Examiner* — Wei Y Zhen
*Assistant Examiner* — Brahim Bourzik
(74) *Attorney, Agent, or Firm* — Conely Rose, P.C.

(57) ABSTRACT

A data transmission method and apparatus are disclosed, and applied to a daemon process on a host machine. The method includes: obtaining information required for performing an acceleration operation in a virtual input/output ring of a target virtual accelerator, where the information required for performing the acceleration operation uses a predefined data structure, and the data structure occupies one entry of the virtual input/output ring of the target virtual accelerator; determining, according to the information required for performing the acceleration operation, information that can be recognized by the hardware accelerator; and sending the information that can be recognized by the hardware accelerator to the hardware accelerator, where the hardware accelerator is configured to obtain to-be-accelerated data according to the information that can be recognized by the hardware accelerator and perform the acceleration operation on the to-be-accelerated data. The method and apparatus can improve data packet transmission efficiency.

20 Claims, 13 Drawing Sheets

(56) References Cited

U.S. PATENT DOCUMENTS

| | | | |
|---|---|---|---|
| 2007/0061492 A1* | 3/2007 | van Riel | G06F 9/5077 |
| | | | 710/3 |
| 2008/0133709 A1 | 6/2008 | Aloni et al. | |
| 2009/0183180 A1 | 7/2009 | Nelson | |
| 2010/0070677 A1 | 3/2010 | Thakkar | |
| 2011/0246975 A1 | 10/2011 | Baudisson et al. | |
| 2012/0084487 A1 | 4/2012 | Barde | |
| 2013/0152075 A1* | 6/2013 | Cardona | G06F 9/45558 |
| | | | 718/1 |
| 2013/0332927 A1 | 12/2013 | Tang et al. | |
| 2015/0089495 A1 | 3/2015 | Persson et al. | |
| 2016/0210167 A1* | 7/2016 | Bolic | G06F 9/45558 |
| 2017/0039089 A1 | 2/2017 | Xia et al. | |
| 2017/0177396 A1* | 6/2017 | Palermo | H04L 49/70 |
| 2017/0180273 A1* | 6/2017 | Daly | H04L 69/324 |
| 2017/0277396 A1* | 9/2017 | Chung | G06F 3/0482 |
| 2018/0210752 A1 | 7/2018 | Tang et al. | |
| 2018/0307498 A1* | 10/2018 | Yang | G06F 9/4411 |
| 2019/0109765 A1* | 4/2019 | Shibata | H04L 41/5054 |

FOREIGN PATENT DOCUMENTS

| | | |
|---|---|---|
| CN | 103870311 A | 6/2014 |
| CN | 104021063 A | 9/2014 |
| CN | 104615495 A | 5/2015 |
| CN | 104618158 A | 5/2015 |
| CN | 104685479 A | 6/2015 |
| CN | 104951353 A | 9/2015 |
| CN | 105159753 A | 12/2015 |
| CN | 105335211 A | 2/2016 |
| CN | 105389199 A | 3/2016 |
| CN | 106559471 A | 4/2017 |

OTHER PUBLICATIONS

Mohebbi et al;"ZIVM: A Zero-Copy Inter-VM Communication Mechanism for Cloud Computing"; 10 pages (Year: 2011).*

Motakis, A., et al., "Platform Device Assignment to KVM-on-ARM Virtual Machines via VFIO," XP32688466, 2014 International Conference on Embedded and Ubiquitous Computing, 2014, pp. 170-177.

Foreign Communication From A Counterpart Application, European Application No. 17812658.7, Partial Supplementary European Search Report dated Oct. 7, 2019, 10 pages.

"Data structure," May 9, 2016, XP055736088, 4 pages. retrieved from the internet: https://en.wikipedia.org/w/index.php?title=Data%20structureandoldid=719479872.

Sen, L., et al., "Interface Design for Embedded Systems and Linux Driver Development," Beihang University Press, May 2006, with the translation of the related part, 421 pages.

Virtual I/O Device (VIRTIO) Version 1.0, Committee Specification Draft 01 /Public Review Draft 01,Dec. 3, 2013, OASIS, 69 pages.

Majieyue , virtio"s vring queue, CSDN, https://blog.csdn.net/majieyuelarticle/details/51138093, Apr. 17, 2016, 20 pages. With English Translation.

* cited by examiner

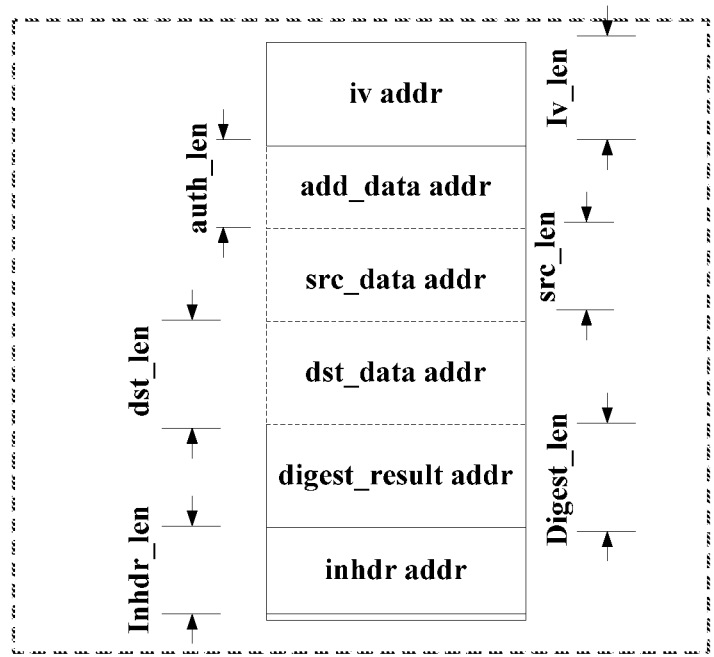
FIG. 5.1
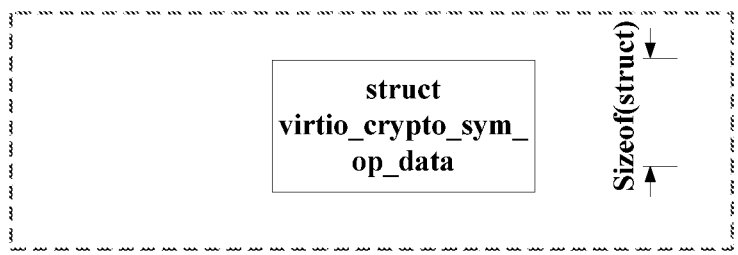
FIG. 5.2

DATA TRANSMISSION METHOD AND APPARATUS

CROSS-REFERENCE TO RELATED APPLICATIONS

This application is a continuation of International Application No. PCT/CN2017/087890, filed on Jun. 12, 2017, which claims priority to Chinese Patent Application No. 201610428164.3, filed on Jun. 15, 2016. The disclosures of the aforementioned applications are hereby incorporated by reference in their entireties.

TECHNICAL FIELD

The present disclosure relates to the field of communications technologies, and in particular, to a data transmission method and apparatus.

BACKGROUND

Network Function Virtualization (NFV), in a combination form of "software+universal hardware", makes hardware universalized. Therefore, functions of network devices no longer rely on dedicated hardware, hardware resources can be fully shared flexibly, fast development and deployment of new services are implemented, and auto deployment, auto scaling, fault isolation, self healing, and the like are performed based on actual service requirements.

However, after the hardware is universalized based on NFV, processing capabilities of hardware devices are insufficient. Consequently, a data packet processing time increases, and a throughput is insufficient. Therefore, a hardware acceleration device needs to be introduced to accelerate data packet processing. Obviously, how to enhance a data packet throughput capability and improve data packet transmission efficiency is a technical problem that needs to be resolved urgently.

SUMMARY

Embodiments of the present disclosure provide a data transmission method and apparatus to improve data packet transmission efficiency.

According to a first aspect, an embodiment of the present disclosure provides a data transmission method, applied to a daemon process on a host machine, where a virtual machine is deployed on the host machine, a hardware accelerator and at least one virtual accelerator configured for the virtual machine are also deployed on the host machine, and the method includes: obtaining information required for performing an acceleration operation in a virtual input/output ring of a target virtual accelerator, where the information required for performing the acceleration operation uses a predefined data structure, and the data structure occupies one entry of the virtual input/output ring of the target virtual accelerator; determining, according to the information required for performing the acceleration operation, information that can be recognized by the hardware accelerator; and sending the information that can be recognized by the hardware accelerator to the hardware accelerator, where the hardware accelerator is configured to obtain to-be-accelerated data according to the information that can be recognized by the hardware accelerator and perform the acceleration operation on the to-be-accelerated data.

The information required for performing the acceleration operation includes a virtual machine physical address of the to-be-accelerated data, a length of the to-be-accelerated data, and a virtual machine physical address for storing an acceleration result, and optionally, may further include an acceleration type parameter (such as an algorithm type or an operation type), and the like. The to-be-accelerated data may include but is not limited to a network packet, a storage packet, a to-be-encrypted file, or the like, and all the to-be-accelerated data is stored in a memory (host memory buffer or virtual machine memory).

The hardware accelerator may be a multi-queue hardware accelerator (that is, supporting a plurality of virtual functions VFs, where each VF is equivalent to a hardware accelerator), or the hardware accelerator may be a single-queue hardware accelerator.

As can be learned, the information required for performing the acceleration operation is encapsulated by using a predefined data structure, and the data structure occupies one entry of the virtual input/output ring of the target virtual accelerator. This can greatly enhance a throughput capability of the virtual input/output ring. Within a unit time, more data packets are transmitted, and therefore data packet transmission efficiency can be improved.

In addition, the daemon process on the host machine runs in host machine user space, and directly accesses the hardware accelerator in the user space without using a kernel protocol stack. Therefore, a quantity of context switches between the user space and kernel space can be minimized, and switch overheads are reduced.

In a possible implementation, the determining, according to the information required for performing the acceleration operation, information that can be recognized by the hardware accelerator includes: determining a host physical address of the to-be-accelerated data according to the virtual machine physical address of the to-be-accelerated data in the information required for performing the acceleration operation and a preset mapping relationship between the virtual machine physical address and the host physical address; and the sending the information that can be recognized by the hardware accelerator to the hardware accelerator includes: sending the host physical address of the to-be-accelerated data to the hardware accelerator; where the hardware accelerator is configured to obtain, according to the host physical address of the to-be-accelerated data, the to-be-accelerated data from a virtual machine memory corresponding to the virtual machine physical address of the to-be-accelerated data, and perform the acceleration operation on the to-be-accelerated data.

In this possible implementation, the mapping relationship between the virtual machine physical address and the host physical address is pre-established, and the hardware accelerator can recognize the host physical address. Therefore, the virtual machine does not need to copy the to-be-accelerated data in the virtual memory to a host memory buffer, and zero copy in a packet sending direction is implemented. The zero copy in the packet sending direction means that the virtual machine does not need to copy the to-be-accelerated data in the virtual machine memory to the host memory buffer in a process of delivering the information required for performing the acceleration operation to the hardware accelerator.

In a possible implementation, the hardware accelerator supports a plurality of virtual functions VFs, and after the determining a host physical address of the to-be-accelerated data, the method further includes: querying, from a preset binding relationship between a virtual accelerator and a VF, a target VF bound to the target virtual accelerator; and the sending the host physical address of the to-be-accelerated data to the hardware accelerator includes: sending the host physical address of the to-be-accelerated data to the target VF, where the target VF is configured to obtain, according to the host physical address of the to-be-accelerated data, the to-be-accelerated data from the virtual machine memory corresponding to the virtual machine physical address of the to-be-accelerated data, and perform the acceleration operation on the to-be-accelerated data.

The binding relationship between the virtual accelerator and the VF is pre-established, so that virtual accelerators do not interfere with each other. Therefore, an acceleration capability of the hardware accelerator is utilized maximally, and performance is optimal.

In a possible implementation, the method further includes: after the to-be-accelerated data undergoes acceleration processing, adding an identifier of the entry to the virtual input/output ring of the target virtual accelerator according to an identifier of the target virtual accelerator in the binding relationship.

This helps the virtual machine corresponding to the target virtual accelerator obtain, according to the identifier of the entry in the virtual input/output ring of the target virtual accelerator, the acceleration result generated after acceleration processing is performed on the to-be-accelerated data in the virtual machine memory. In this manner, zero copy is implemented in a packet receiving direction. The zero copy in the packet receiving direction means that the acceleration result generated after the hardware accelerator (the target VF) performs acceleration processing on the to-be-accelerated data does not need to be copied from the host memory buffer to the virtual machine memory either.

As can be learned, for a multi-queue hardware accelerator, the identifier of the target virtual accelerator can be obtained based on the binding relationship. A bidirectional zero copy solution (that is, zero copy in the packet sending direction and zero copy in the packet receiving direction) is used in the sending and receiving directions above. In a whole bidirectional zero copy process in the sending and receiving directions, the to-be-accelerated data and the generated acceleration result are always stored in the virtual machine memory. Zero copy is implemented in a whole path of an accelerated data stream, almost without additional CPU consumption. In addition, the solution of the present disclosure reserves advantages of a paravirtualization technology, such as a VM migration capability and virtualized network function container VNFC code portability (that is, hardware non-perceptivity).

In a possible implementation, before the obtaining information required for performing an acceleration operation in a virtual input/output ring of a target virtual accelerator, the method further includes: if the hardware accelerator supports a plurality of virtual functions VFs, selecting an unused target VF from the plurality of VFs, and establishing a binding relationship between the target virtual accelerator and the target VF, where the target VF is any one of unused VFs.

In a possible implementation, before the sending the host physical address of the to-be-accelerated data to the hardware accelerator, the method further includes: recording an identifier of the target virtual accelerator.

The identifier of the target virtual accelerator may be recorded in a specified location in the host memory buffer. The specified location, may be, for example, space with an offset of four bytes or space with an offset of eight bytes.

In a possible implementation, the method further includes: after the to-be-accelerated data undergoes acceleration processing, adding an identifier of the entry to the virtual input/output ring of the target virtual accelerator according to the recorded identifier of the target virtual accelerator.

This helps the virtual machine corresponding to the target virtual accelerator obtain, according to the identifier of the entry in the virtual input/output ring of the target virtual accelerator, the acceleration result generated after acceleration processing is performed on the to-be-accelerated data in the virtual machine memory. In this manner, zero copy is implemented in a packet receiving direction.

As can be learned, for a single-queue hardware accelerator, the identifier of the target virtual accelerator can be obtained from recorded information. A bidirectional zero copy solution is used in the sending and receiving directions above. In a whole bidirectional zero copy process in the sending and receiving directions, the to-be-accelerated data and the generated acceleration result are always stored in the virtual machine memory. Zero copy is implemented in a whole path of an accelerated data stream, almost without additional CPU consumption. In addition, the solution of the present disclosure reserves advantages of a paravirtualization technology, such as a VM migration capability and VNFC code portability (that is, hardware non-perceptivity).

In a possible implementation, the determining, according to the information required for performing the acceleration operation, information that can be recognized by the hardware accelerator includes: determining a host virtual address of the to-be-accelerated data in a virtual machine memory according to the virtual machine physical address of the to-be-accelerated data in the information required for performing the acceleration operation and a preset mapping relationship between the virtual machine physical address and the host virtual address; copying the to-be-accelerated data to a host memory buffer according to the host virtual address of the to-be-accelerated data in the virtual machine memory; and determining a host physical address of the to-be-accelerated data in the host memory buffer according to a host virtual address of the to-be-accelerated data in the host memory buffer and a preset mapping relationship between the host virtual address and the host physical address; and the sending the information that can be recognized by the hardware accelerator to the hardware accelerator includes: sending the host physical address of the to-be-accelerated data to the hardware accelerator; where the hardware accelerator is configured to obtain the to-be-accelerated data from the host memory buffer according to the host physical address of the to-be-accelerated data, and perform the acceleration operation on the to-be-accelerated data.

In this possible implementation, because only the mapping relationship between the virtual machine physical address and the host virtual address is pre-established, and the mapping relationship between the virtual machine physical address and the host physical address is not established, but the hardware accelerator can recognize only the host physical address, the host virtual address of the to-be-accelerated data needs to be translated into the host physical address of the to-be-accelerated data that can be recognized by the hardware accelerator. In this manner, the virtual machine needs to copy the to-be-accelerated data in the virtual memory to the host memory buffer.

In a possible implementation, the method further includes: after the to-be-accelerated data undergoes acceleration processing, copying the generated acceleration result to the virtual machine memory; and adding an identifier of the entry to the virtual input/output ring of the target virtual accelerator according to an identifier of the target virtual accelerator.

After the to-be-accelerated data undergoes acceleration processing, the daemon process on the host machine further needs to copy the generated acceleration result from the host memory buffer to the virtual machine memory, so that the virtual machine obtains the acceleration result from the virtual machine memory subsequently.

In a possible implementation, after the adding an identifier of the entry to the virtual input/output ring of the target virtual accelerator, the method further includes: sending an interrupt request carrying the identifier of the target virtual accelerator to the virtual machine corresponding to the target virtual accelerator, to trigger the virtual machine to query the identifier of the entry in the virtual input/output ring of the target virtual accelerator according to the identifier of the target virtual accelerator and obtain the acceleration result generated after the to-be-accelerated data undergoes acceleration processing.

Specifically, the daemon process on the host machine may use an eventfd (event handler) mechanism of a Linux kernel to send the interrupt request carrying the identifier of the target virtual accelerator to the virtual machine corresponding to the target virtual accelerator.

According to a second aspect, an embodiment of the present disclosure discloses a data transmission method, applied to a daemon process on a host machine, where a virtual machine is deployed on the host machine, a hardware accelerator and at least one virtual accelerator configured for the virtual machine are also deployed on the host machine, and the method includes: obtaining an identifier of a target virtual accelerator after to-be-accelerated data undergoes acceleration processing; and adding an identifier of at least one entry to a virtual input/output ring of the target virtual accelerator according to the identifier of the target virtual accelerator, so that the virtual machine corresponding to the target virtual accelerator obtains, according to the identifier of the at least one entry, an acceleration result generated after the to-be-accelerated data undergoes acceleration processing, where the at least one entry stores information required for performing an acceleration operation on the to-be-accelerated data.

In this manner, regardless of whether one or more entries are occupied by the information required for performing the acceleration operation on the to-be-accelerated data, the identifier of the target virtual accelerator can be obtained after the to-be-accelerated data undergoes acceleration processing, and the identifier of the at least one entry can be added to the virtual input/output ring of the target virtual accelerator. This helps the virtual machine corresponding to the target virtual accelerator obtain, according to the identifier of the at least one entry, the acceleration result generated after the to-be-accelerated data undergoes acceleration processing. As can be learned, memory copy is not performed in a whole process, and zero copy in a packet receiving direction is implemented.

In a possible implementation, the hardware accelerator supports a plurality of virtual functions VFs, and before the obtaining an identifier of a target virtual accelerator after to-be-accelerated data undergoes acceleration processing, the method further includes: selecting an unused target VF from the plurality of VFs, and establishing a binding relationship between the target virtual accelerator and the target VF; where the identifier of the target virtual accelerator is obtained based on the binding relationship.

In a possible implementation, before the obtaining an identifier of a target virtual accelerator after to-be-accelerated data undergoes acceleration processing, the method further includes: recording the identifier of the target virtual accelerator.

The identifier of the target virtual accelerator may be recorded in a specified location in a host memory buffer. The specified location, may be, for example, space with an offset of four bytes or space with an offset of eight bytes.

In a possible implementation, a manner of adding the identifier of the at least one entry to the virtual input/output ring of the target virtual accelerator according to the identifier of the target virtual accelerator, so that the virtual machine corresponding to the target virtual accelerator obtains, according to the identifier of the at least one entry, the acceleration result generated after the to-be-accelerated data undergoes acceleration processing, is specifically: adding the identifier of the at least one entry to the virtual input/output ring of the target virtual accelerator according to the identifier of the target virtual accelerator, and sending an interrupt request carrying the identifier of the target virtual accelerator to the virtual machine corresponding to the target virtual accelerator, so that the virtual machine, in response to the interrupt request, queries the identifier of the at least one entry in the virtual input/output ring of the target virtual accelerator and obtains the acceleration result generated after the to-be-accelerated data undergoes acceleration processing; or adding the identifier of the at least one entry to the virtual input/output ring of the target virtual accelerator according to the identifier of the target virtual accelerator, so that the virtual machine corresponding to the target virtual accelerator monitors the identifier of the at least one entry in the virtual input/output ring of the target virtual accelerator and obtains, according to the identifier of the at least one entry in the virtual input/output ring of the target virtual accelerator, the acceleration result generated after the to-be-accelerated data undergoes acceleration processing.

Two manners are provided: The interrupt request carrying the identifier of the target virtual accelerator may be sent to the virtual machine corresponding to the target virtual accelerator, to trigger the virtual machine to query the identifier of the at least one entry in the virtual input/output ring of the target virtual accelerator; or the virtual machine may actively monitor the virtual input/output ring of the target virtual accelerator to obtain the identifier of the at least one entry.

According to a third aspect, an embodiment of the present disclosure discloses a data transmission apparatus, applied to a daemon process on a host machine, where a virtual machine is deployed on the host machine, a hardware accelerator and at least one virtual accelerator configured for the virtual machine are also deployed on the host machine, and the data transmission apparatus includes function units configured to perform some or all steps of any method in the first aspect of the embodiments of the present disclosure. Data packet transmission efficiency can be improved when the data transmission apparatus performs some or all steps of any method in the first aspect.

According to a fourth aspect, an embodiment of the present disclosure discloses a data transmission apparatus, applied to a daemon process on a host machine, where a virtual machine is deployed on the host machine, a hardware accelerator and at least one virtual accelerator configured for the virtual machine are also deployed on the host machine, and the data transmission apparatus includes function units configured to perform some or all steps of any method in the second aspect of the embodiments of the present disclosure. CPU resource consumption can be reduced when the data transmission apparatus performs some or all steps of any method in the second aspect.

According to a fifth aspect, an embodiment of the present disclosure discloses a host machine, where the host machine includes a processor, a hardware accelerator, and a memory. The memory is configured to store instructions, the processor is configured to run the instructions, and the processor runs the instructions to perform some or all steps of any method in the first aspect of the embodiments of the present disclosure. Data packet transmission efficiency can be improved when the host machine performs some or all steps of any method in the first aspect.

According to a sixth aspect, an embodiment of the present disclosure discloses a host machine, where the host machine includes a processor, a hardware accelerator, and a memory. The memory is configured to store instructions, the processor is configured to run the instructions, and the processor runs the instructions to perform some or all steps of any method in the second aspect of the embodiments of the present disclosure. Data packet transmission efficiency can be improved when the host machine performs some or all steps of any method in the second aspect.

According to a seventh aspect, an embodiment of the present disclosure discloses a computer storage medium, where the computer storage medium stores a program, and the program specifically includes an instruction used to perform some or all steps of any method in the first aspect of the embodiments of the present disclosure.

According to an eighth aspect, an embodiment of the present disclosure discloses a computer storage medium, where the computer storage medium stores a program, and the program specifically includes an instruction used to perform some or all steps of any method in the second aspect of the embodiments of the present disclosure.

In some feasible implementations, after an identifier of an entry is added to a virtual input/output ring of a target virtual accelerator, a VNF on a virtual machine may further actively monitor the virtual input/output ring of the target virtual accelerator to obtain an acceleration result generated after to-be-accelerated data undergoes acceleration processing. Specifically, the VNF on the virtual machine may actively monitor a vring_used table in the virtual input/output ring of the target virtual accelerator, and if the vring_used table is updated, obtain an identifier of an entry of a vring_desc table recorded in the vring_used table, where the entry is a vring_desc entry that has undergone acceleration. Further, the virtual machine may obtain corresponding entry content (to be specific, a data structure for storing information required for performing an acceleration operation) from the vring_desc entry of the virtual input/output ring. Still further, the virtual machine may obtain the acceleration result from a virtual machine memory corresponding to a virtual machine physical address that is recorded in the data structure and used for storing the acceleration result.

In this manner, no interrupt is generated. This can prevent the virtual machine from performing an interrupt processing operation and interrupting current CPU processing logic, reduce interrupt overheads, and enhance performance of the virtualized network function VNF.

In some feasible implementations, the data structure used by the information delivered by the virtual machine and required for performing the acceleration operation occupies at least one entry of the virtual input/output ring of the target virtual accelerator, and a bidirectional zero copy solution is used in a sending direction and a receiving direction. Although a throughput capability of the virtual input/output ring cannot be enhanced in this manner, memory copy is not required in the sending direction and the receiving direction. In comparison with the prior art, CPU resource consumption can be reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 5.1 is a storage form of information required for performing an acceleration operation in a Vring according to an embodiment of the present disclosure;

FIG. 5.2 is another storage form of information required for performing an acceleration operation in a Vring according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", and the like are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of the present disclosure. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

Embodiments of the present disclosure disclose a data transmission method and apparatus to improve data packet transmission efficiency. Detailed descriptions are separately provided below.

For a better understanding of a data transmission method disclosed by an embodiment of the present disclosure, the following first describes a network architecture to which the embodiment of the present disclosure is applicable.

Figure 1:
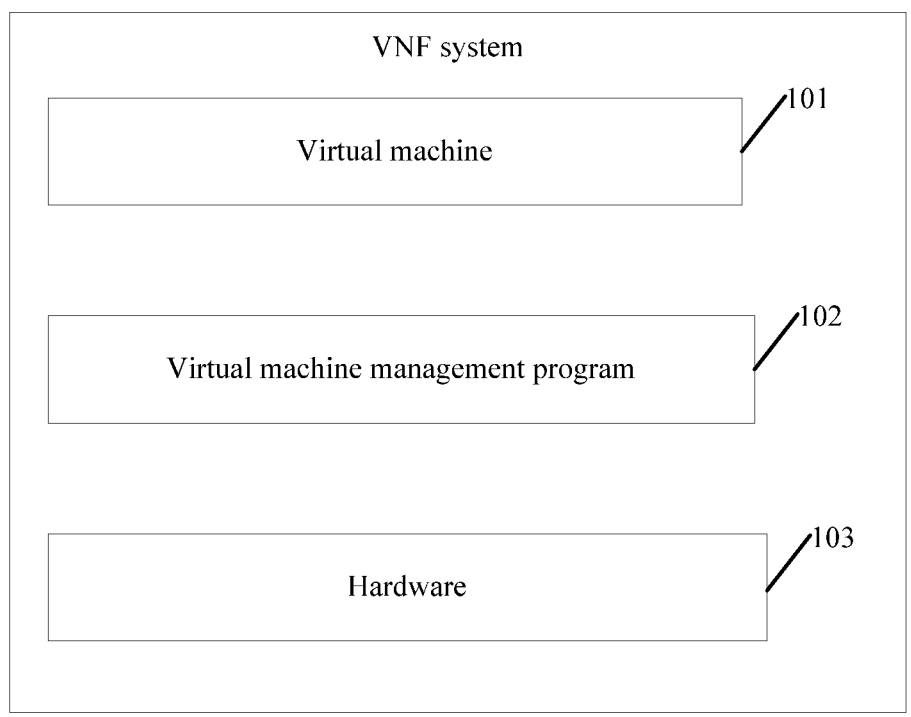
FIG. 1 is a schematic diagram of a network architecture of a VNF system according to an embodiment of the present disclosure.

Referring to FIG. 1, FIG. 1 is a schematic diagram of a network architecture of a VNF system according to an embodiment of the present disclosure. As shown in FIG. 1, the Virtualized Network Function (VNF) system includes a virtual machine (Virtual Manufacturing, VM) 101, a virtual machine monitor (Hypervisor) 102, and hardware 103.

The VM 101 may include a virtualized network function VNF, a guest operating system, a virtual processor, a virtual memory, a virtual hard disk, and the like.

The hypervisor 102 may emulate at least one virtual accelerator for each virtual machine.

The hardware 103 may include but is not limited to a Central Processing Unit (CPU) that can provide a special instruction, a SoC chip (System-on-a-Chip), and other hardware devices that may provide acceleration functions, for example, a Graphics Processing Unit (GPU), and an Field-Programmable Gate Array (FPGA). Acceleration is to offload some functions in a program to hardware for execution to achieve an effect of shortening a program execution time. Common acceleration functions include encryption/decryption, compression/decompression, audio or video coding/decoding, packet processing, and the like.

Figure 2:
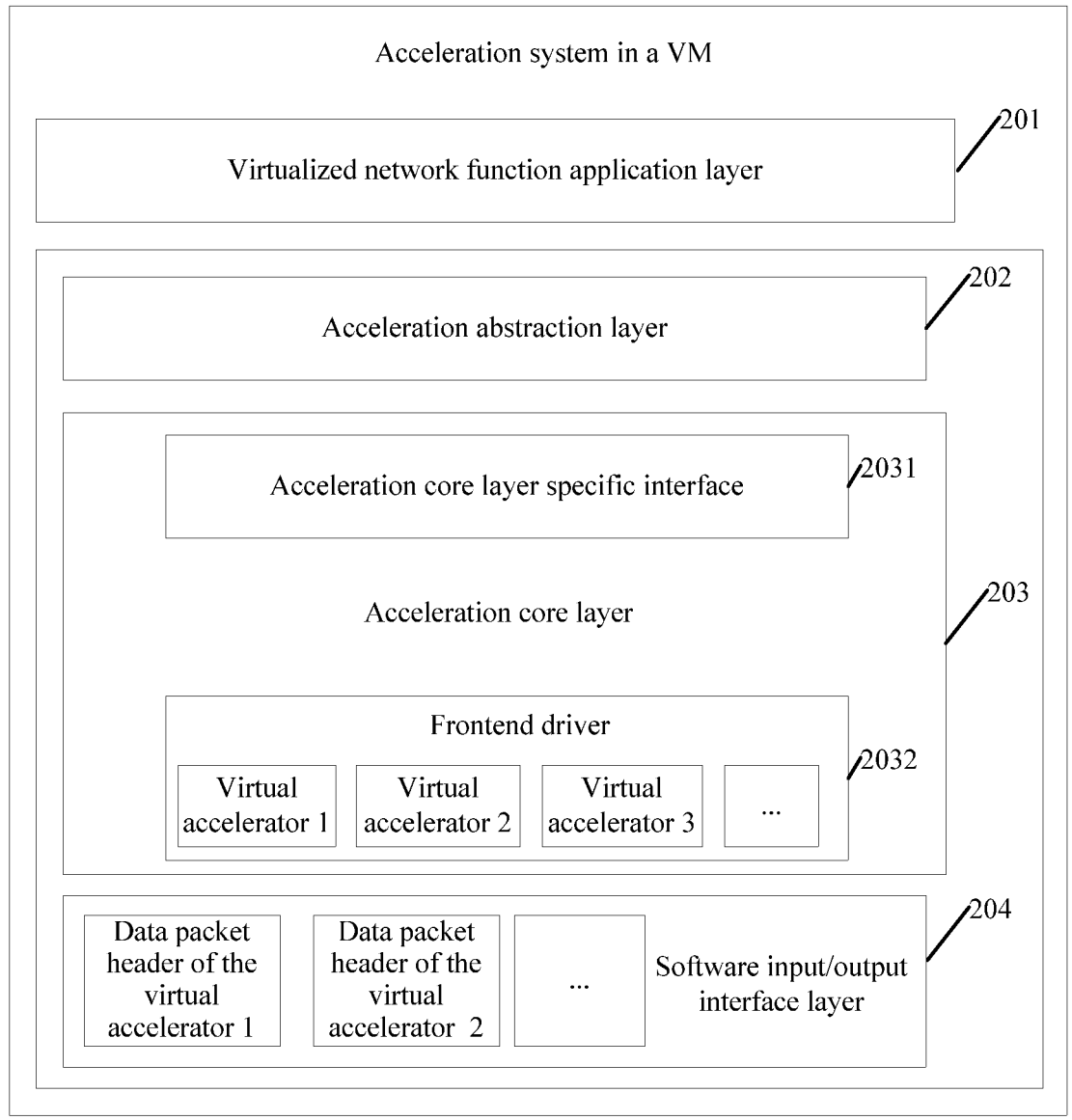
FIG. 2 is a schematic diagram of an architecture of an acceleration system in a VM according to an embodiment of the present disclosure.

Referring to FIG. 2, FIG. 2 is a schematic diagram of an architecture of an acceleration system in a VM according to an embodiment of the present disclosure. As shown in FIG. 2, the acceleration system in the VM includes a virtualized network function application layer 201, an acceleration abstraction layer 202, an acceleration core layer 203, and a software input/output interface layer 204. The virtualized network function application layer 201 is a VM that needs to use a virtual accelerator. The acceleration abstraction layer (AAL) 202 is mainly configured to provide a universal Application Programming Interface (API) layer for different virtual accelerators. The acceleration core (AC) layer 203 is, for example, a data plane development kit (DPDK), an Open Data Plane (ODP), or another high-performance acceleration software implementation framework. The AC includes an acceleration core layer specific interface (AC specific API, s-API) 2031 and a frontend driver 2032 configured for each virtual accelerator. The virtual accelerator is a virtualized form of a physical hardware accelerator, and may be understood as a virtual hardware accelerator. The virtual machine can perceive only a virtual accelerator. The virtual accelerator is similar to a virtual network interface card or a virtual magnetic disk. For example, the virtual accelerator is VirtIO-crypto, VirtIO-ipsec, or VirtIO-compression. The software input/output interface (sio) layer 204 includes a plurality of data packet headers of virtual accelerators, for example, a VirtIO-crypto header and a VirtIO-ipsec header, where the sio is an interface for performing data transmission between a frontend driver of each virtual accelerator and a backend device (Hypervisor), for example, a Virtual In/Out) (VirtIO) interface.

Figure 3:
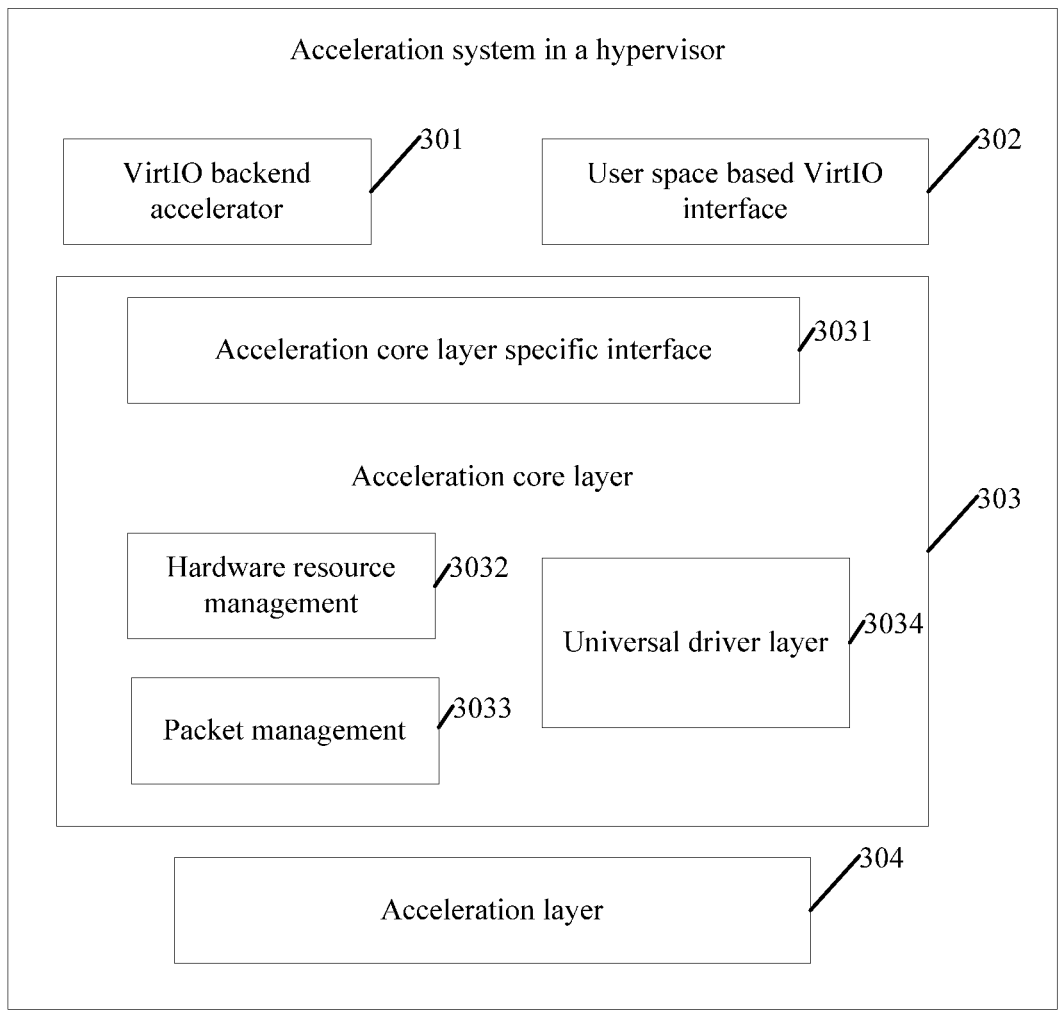
FIG. 3 is a schematic diagram of an architecture of an acceleration system in a hypervisor according to an embodiment of the present disclosure.

Referring to FIG. 3, FIG. 3 is a schematic diagram of architecture of an acceleration system in a hypervisor according to an embodiment of the present disclosure. As shown in FIG. 3, the acceleration system in the hypervisor includes a VirtIO backend accelerator 301, a user space based VirtIO interface 302, an acceleration core layer 303, and an acceleration layer 304. The VirtIO backend accelerator (backend device) 301 is a virtual accelerator emulated by a virtual machine emulator (QEMU). The user space based VirtIO interface (User space based VirtIO interface, vHost-user) 302 uses a user space solution, and implements a fast transmission technology based on a VirtIO interface by using a high-rate data transmission channel between a virtual machine and a host. The acceleration core layer 303 includes an acceleration core layer specific interface 3031, hardware resource management 3032, packet management 3033, and a universal driver layer 3034. The hardware resource management 3032 supports an ordinary hardware accelerator (referred to as a single-queue hardware accelerator in the present disclosure) and supports a hardware accelerator with an SR-IOV function (referred to as a multi-queue hardware accelerator in the present disclosure). Queue allocation and recycling mechanisms are provided for the multi-queue hardware accelerator. The hardware accelerator supporting the SR-IOV function may obtain a plurality of VFs (Virtual Functions through virtualization, where each VF corresponds to a hardware accelerator. Depending on a memory management mechanism of the AC, packet management provides a function of accelerating data packet identification for the single-queue accelerator. The acceleration layer 304 accelerates resources and the like for various acceleration software and hardware and CPU instructions.

Figure 4:
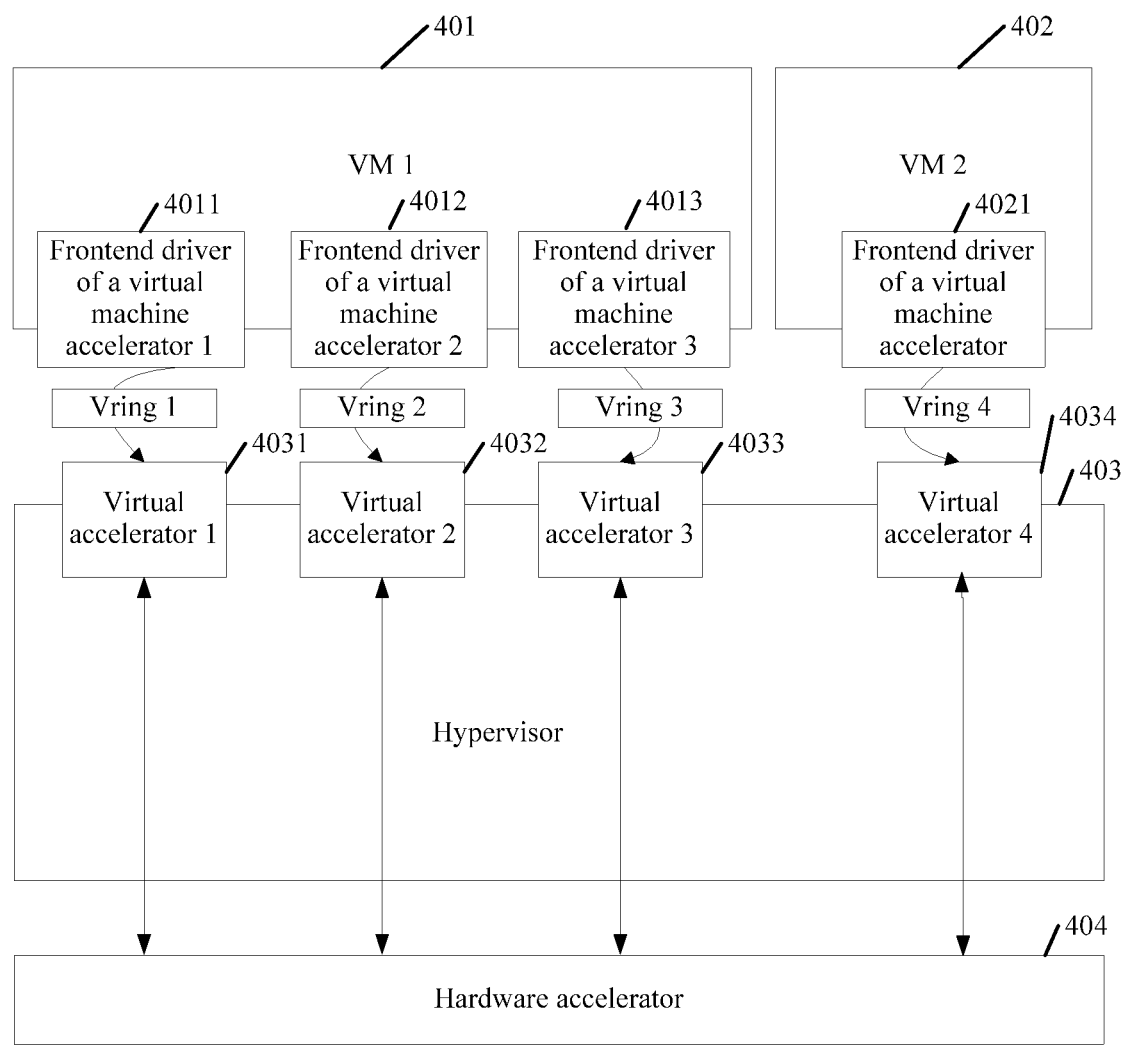
FIG. 4 is a schematic diagram of a network architecture of another VNF system according to an embodiment of the present disclosure.

Referring to FIG. 4, FIG. 4 is a schematic diagram of a network architecture of another VNF system according to an embodiment of the present disclosure. FIG. 4 is a specific form of FIG. 1. As shown in FIG. 4, at least one virtual accelerator is configured for each VM, and each virtual accelerator has a corresponding frontend driver of the virtual accelerator and a virtual input/output ring (Vring). For example, a frontend driver 4011 of a virtual machine accelerator 1 and a Vring1, a frontend driver 4012 of a virtual machine accelerator 2 and a Vring2, and a frontend driver 4013 of a virtual machine accelerator 3 and a Vring3 are configured for a VM 1-401; and a frontend driver 4021 of a virtual machine accelerator and a Vring4 are configured for a VM 2-402. A hypervisor 403 emulates a plurality of virtual accelerators, for example, a virtual accelerator 1-4031, a virtual accelerator 2-4032, a virtual accelerator 3-4033, and a virtual accelerator 4-4034.

In the VNF system shown in FIG. 4, information required for performing an acceleration operation and sent by a VM passes through a frontend driver of a virtual accelerator. In the frontend driver of the virtual accelerator, the information required for performing the acceleration operation is added to a predefined data structure. Further, the data structure is stored in a Vring of the virtual accelerator, and is finally transferred to a hardware accelerator 404 through the hypervisor 403. The hardware accelerator performs acceleration processing on to-be-accelerated data, where the to-be-accelerated data may include but is not limited to a network packet, a storage packet, a to-be-encrypted file, or the like. All the to-be-accelerated data is stored in a memory (host memory buffer or virtual machine memory). A daemon process on a host machine may poll and monitor whether the hardware accelerator has completed the acceleration processing operation on the to-be-accelerated data; and if detecting that the acceleration processing operation is complete, the daemon process on the host machine may add an identifier of an entry to a virtual input/output ring of a target virtual accelerator. The frontend driver of the virtual accelerator performs parsing processing on the entry and finally transfers the entry to a VNF of the VM. It should be noted that the information required for performing the acceleration operation does not include the to-be-accelerated data that needs to undergo acceleration processing. The information required for performing the acceleration operation includes, for example, a packet length, an encryption/decryption algorithm type, a key length, a length of the to-be-accelerated data, and a related Guest Physical Address (GPA), which is also referred as virtual machine physical address, for example, a GPA of the to-be-accelerated data, or a GPA for storing an acceleration result.

Optionally, if the hardware accelerator supports a plurality of VFs, when a virtual accelerator is created for the VM, an unused VF is immediately bound to the virtual accelerator in the daemon process. In this way, a data packet received from the specified VF can be notified to the virtual machine corresponding to the virtual accelerator, and there is no need to perform memory copy. Optionally, if the hardware accelerator is an ordinary single-queue hardware accelerator, when sending a data packet, the daemon process uses a specified location (for example, space with an offset of four bytes) in a memory buffer (mbuf) to record an identifier of the virtual accelerator of the virtual machine. After the hardware accelerator performs acceleration processing on the to-be-accelerated data, the daemon process fetches the identifier of the virtual accelerator recorded in the mbuf, and therefore can notify the virtual machine corresponding to the virtual accelerator, without performing memory copy.

Figure 5:
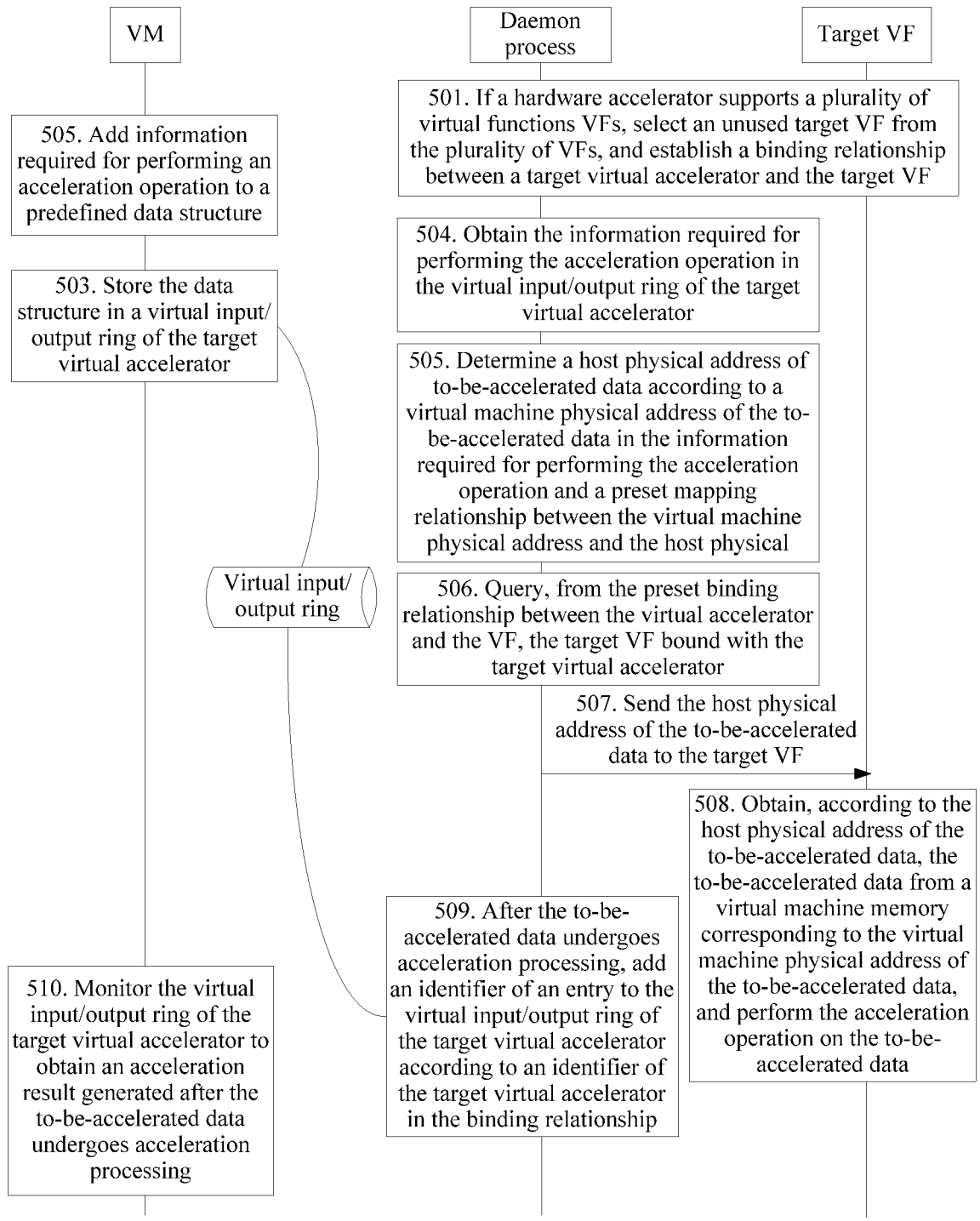
FIG. 5 is a schematic flowchart of a data transmission method according to an embodiment of the present disclosure.

Referring to FIG. 5, FIG. 5 is a schematic flowchart of a data transmission method according to an embodiment of the present disclosure. The method is drafted from a plurality of perspectives such as a virtual machine, a daemon process on a host machine, and a hardware accelerator. The method uses a bidirectional zero copy solution. As shown in FIG. 5, the method may include the following steps.

501. If a hardware accelerator supports a plurality of virtual functions VFs, a daemon process on a host machine selects an unused target VF from the plurality of VFs, and establishes a binding relationship between a target virtual accelerator and the target VF.

In this embodiment of the present disclosure, a virtual machine, a hardware accelerator, and at least one virtual accelerator configured for the virtual machine are deployed on the host machine. The hardware accelerator may be a single-queue hardware accelerator, or may be a multi-queue hardware accelerator (that is, the hardware accelerator supports a plurality of virtual functions VFs, where each VF is equivalent to a hardware accelerator).

If the hardware accelerator supports a plurality of VFs, the daemon process on the host machine may select an unused target VF from the plurality of VFs in an initialization phase, and establish a binding relationship between the target virtual accelerator and the target VF. The target VF may be any one of unused VFs.

It should be noted that, in this embodiment of the present disclosure, a plurality of binding relationships may be established. After the plurality of binding relationships are established, virtual accelerators do not interfere with each other, and performance is optimal.

In an optional implementation, before step 501, the method may further include the following steps.

(11) Start the daemon process and a full polling service on the host machine.

(12) The daemon process on the host machine creates a host memory buffer pool.

(13) Configure at least one virtual accelerator for a virtual machine.

(14) A virtual machine emulator (QEMU) creates a virtual machine.

(15) The QEMU sends a physical memory address layout of the virtual machine to the daemon process on the host machine by using the vhost-user protocol.

(16) The daemon process on the host machine establishes a mapping relationship between a GPA and a host physical address (HPA) according to the physical memory address layout of the virtual machine, and establishes a mapping relationship between the GPA and a host virtual address (HVA).

In this optional implementation, the daemon process on the host machine is also used as a service of the host machine and is automatically started after the host machine is powered on. After being started, the daemon process on the host machine immediately scans the hardware accelerator, initializes a management structure of the hardware accelerator, creates the host memory buffer pool, and registers a vhost-user server listening port. An administrator configures at least one virtual accelerator (referred to as a target virtual accelerator) for the virtual machine, and starts a QEMU process to create the virtual machine. The QEMU process sends a Unix message to the daemon process by using the vhost-user protocol. The daemon process on the host machine creates a server end virtual accelerator after receiving the message sent by the QEMU process. The QEMU process sends the physical memory address layout of the virtual machine to the daemon process on the host machine by using the vhost-user protocol. After receiving the message, the daemon process on the host machine establishes the mapping relationship between the GPA and the HPA according to the physical memory address layout of the virtual machine, and establishes the mapping relationship between the GPA and the HVA.

502. The virtual machine adds information required for performing an acceleration operation to a predefined data structure.

The information required for performing the acceleration operation may include but is not limited to a virtual machine physical address of to-be-accelerated data, a length of the to-be-accelerated data, and a virtual machine physical address for storing an acceleration result, an acceleration type parameter (such as an algorithm type or an operation type), and the like.

type parameter (such as an algorithm type or an operation type), where the GPA may also be referred to as a virtual machine physical address.

Using the encryption/decryption virtual accelerator as an example, the following data structure is defined for an encryption/decryption operation:

```
struct virtio_crypto_sym_op_data {
  struct virtio_crypto_sym_op_hdr {
    __u32 iv_len; /* length of initial vector */
    __u32 auth_len; /* length of associated data */
    __u32 source_len; /* length of source data */
    __u32 digest_result_len; /* length of digest result */
    __u8 inhdr_len; /* length of in header */-----Length of the encryption/decryption check success identifier
  };
  uint64_t iv_addr; /* iv guest address */-------Virtual machine physical address of the initial vector
  uint64_t auth_data_addr; /* associated data guest address */-----Virtual machine physical address of the associated data
  uint64_t src_data_addr; /* source data guest address */------Virtual machine physical address of the source data
  uint64_t dst_data_addr; /* destination data guest address */----Virtual machine physical address for storing the encryption result
  uint64_t digest_result_addr; /* digest result guest address */----Virtual machine physical address for storing the digest result
  uint64_t inhdr_addr; /* in header guest address */----Virtual machine physical address of the encryption/decryption check success identifier
};
```

Common acceleration functions include encryption/decryption, compression/decompression, audio or video coding/decoding, packet processing, and the like. Using encryption/decryption as an example, if a symmetric encryption operation with associated data needs to be performed, information (that is, the information required for performing the acceleration operation) that needs to be transferred to the hardware accelerator includes: an initial vector (iv), associated data (auth_data), to-be-encrypted source data (src_data), an encryption result (dst_data), a digest result (digest_result), and an encryption/decryption check success identifier (inhdr). The to-be-accelerated data may include but is not limited to a network packet, a storage packet, a to-be-encrypted file, or the like, and all the to-be-accelerated data is stored in a memory (host memory buffer or virtual machine memory).

In the prior art, six entries in a Vring of a virtual accelerator need to be occupied during encryption/decryption of a data packet in this way. Referring to FIG. 5.1, FIG. 5.1 is a storage form of information required for performing an acceleration operation in a Vring according to an embodiment of the present disclosure. As shown in FIG. 5.1, using encryption/decryption as an example, six pieces of data parameter information (that is, information required for performing an acceleration operation) need to be transferred to the hardware accelerator, where each piece of data parameter information occupies one entry of the Vring. It is assumed that a size of a Vring created for an encryption/decryption virtual accelerator is 4096, and therefore, a maximum quantity of encrypted/decrypted packets stored at a time is 682 (4096/6).

In this embodiment of the present disclosure, to increase a data packet throughput, a data structure is predefined. The data structure includes information required for performing an acceleration operation, for example, a GPA of to-be-accelerated data, a length of the to-be-accelerated data, a GPA for storing an acceleration result, and an acceleration An application program of a virtualized network function (Virtualized Network Function, VNF) needs to transfer only parameter information recorded in struct virtio_crypto_sym_op_data to a frontend driver of the encryption/decryption virtual accelerator. The frontend driver of the encryption/decryption virtual accelerator directly assigns values to the struct virtio_crypto_sym_op_data data structure, and then adds the data structure as an entry to the Vring of the virtual accelerator. Therefore, for the encryption/decryption virtual accelerator, each symmetric encryption/decryption algorithm needs to occupy only one entry of the Vring, where vring_desc.addr=struct virtio_crypto_sym_op_data/----GPA of the data structure vring_desc.len=sizeof(struct virtio_crypto_sym_op_data)/----Length of the data structure vring_desc.flag=~NEXT/----Entry end flag Referring to FIG. 5.2, FIG. 5.2 is another storage form of information required for performing an acceleration operation in a Vring according to an embodiment of the present disclosure. As can be seen from FIG. 5.2, the data structure occupies one entry of a virtual input/output ring of a virtual accelerator. For a Vring with a size of 4096, 4096 encrypted/decrypted data packets may be stored at a time. In the storage form of the information required for performing an acceleration operation in the Vring in FIG. 5.2, performance is enhanced fivefold in comparison with a conventional solution shown in FIG. 5.1, and a data packet throughput capability of the virtual input/output ring is enhanced effectively.

503. The virtual machine stores the data structure in a virtual input/output ring of the target virtual accelerator.

In this embodiment of the present disclosure, the target virtual accelerator is any one of a plurality of virtual accelerators configured for the virtual machine, and is referred to as the target virtual accelerator for ease of subsequent description.

Specifically, the VNF of the virtual machine invokes a frontend driver API of the virtual accelerator to transfer the information (including the GPA of the to-be-accelerated data, the GPA for storing the acceleration result, and the like) required for performing the acceleration operation to the frontend driver. The frontend driver requests a host memory buffer from the host memory buffer pool, and uses the information to construct the information required for performing the acceleration operation. Finally, the front-end driver invokes a VirtIO API to put the information required for performing the acceleration operation and the length into a vring_desc table of the Vring.

In this embodiment of the present disclosure, a Vring shared area includes three tables in total: a vring_desc table, used to store an address of an IO request generated by the virtual machine; a vring_avail table, used to specify which entries are available in the vring_desc table; and a vring_used table, used to specify which entries in the vring_desc are already delivered to hardware.

The address (for example, a GPA address) of the IO request generated by the virtual machine in the virtual machine memory is stored in the vring_desc table, and each row in the table includes four fields: addr, len, flags, and next as shown below:

```
struct vring_desc {
    /* Address (guest-physical). */
    __virtio64 addr;
    /* Length. */
    __virtio32 len;
    /* The flags as indicated above. */
    __virtio16 flags;
    /* We chain unused descriptors via this, too */
    __virtio16 next;
};
```

"addr" stores a memory address of an IO request in the virtual machine, and is generally a GPA value; "len" indicates a length of the IO request in the memory; "flags" indicates whether data in the row is readable or writable and whether it is a last entry of the IO request; each IO request may include a plurality of rows in the vring_desc table, and the next field specifies in which row a next entry of the IO request is. By using "next", a plurality of rows of an IO request stored in the vring_desc may be connected to form a linked list. When flag=~VRING_DESC_F_NEXT, it indicates an end of the linked list.

A location of a header of a linked list formed by connecting each IO request in the vring_desc is stored in the vring_avail table. A data structure is as follows:

```
struct vring_avail {
    __virtio16 flags;
    __virtio16 idx;
    __virtio16 ring[ ];
};
```

In the vring_avail table, a location of a header of a linked list formed by using the next field in the vring_desc table is stored in the array ring[ ]; "idx" points to a next available location in the ring array; and "flags" is a flag field.

For the vring_used table, after the to-be-accelerated data undergoes acceleration processing, the daemon process on the host machine may update the data structure:

```
/* u32 is used here for ids for padding reasons. */
struct vring_used_elem {
    /* Index of start of used descriptor chain. */
    __virtio32 id;
    /* Total length of the descriptor chain which was used (written to)
    */
    __virtio32 len;
};
struct vring_used {
    __virtio16 flags;
    __virtio16 idx;
    struct vring_used_elem ring[ ];
};
```

The ring[ ] array in the vring_used includes two elements: id and len, where "id" indicates a location of a first node of a linked list formed by a processed IO request in the vring_desc table, and "len" indicates a length of the linked list. "idx" points to a next available location in the ring array; and "flags" is a flag field.

It should be noted that the IO request may be understood as a data structure including information required for performing an acceleration operation in this embodiment of the present disclosure.

504. The daemon process on the host machine obtains the information required for performing the acceleration operation in the virtual input/output ring of the target virtual accelerator.

In this embodiment of the present disclosure, the daemon process on the host machine runs in host-user user space, and directly accesses the hardware accelerator in the user space without using a kernel protocol stack. This minimizes a quantity of context switches between the user space and kernel space, and reduces switch overheads. The daemon process on the host machine is located in a hypervisor.

Optionally, that the daemon process on the host machine obtains the information required for performing the acceleration operation in the virtual input/output ring of the target virtual accelerator may be specifically implemented in the following manner:

The daemon process on the host machine monitors the virtual input/output ring of each virtual accelerator in real time in a full polling mode to obtain the information required for performing the acceleration operation in the virtual input/output ring of the target virtual accelerator.

In this optional implementation, specifically, the daemon process on the host machine may monitor the vring_desc table in the virtual input/output ring of each virtual accelerator in real time in the full polling mode to obtain the information required for performing the acceleration operation in the vring_desc table in the virtual input/output ring. In this manner, interrupt processing overheads are reduced.

Optionally, that the daemon process on the host machine obtains the information required for performing the acceleration operation in the virtual input/output ring of the target virtual accelerator may be specifically implemented in the following manner:

The virtual machine sends an information obtaining notification carrying an identifier of the target virtual accelerator to the daemon process on the host machine; and the daemon process on the host machine obtains, according to the identifier of the target virtual accelerator, the information required for performing the acceleration operation from the virtual input/output ring of the target virtual accelerator.

In this optional implementation, specifically, the virtual machine sends a message notification carrying the identifier of the target virtual accelerator to the daemon process on the host machine; and after receiving the message notification, the daemon process on the host machine obtains, according to the identifier of the target virtual accelerator, the information required for performing the acceleration operation from the vring_desc table in the virtual input/output ring of the target virtual accelerator.

In this manner, the full polling mode is not used, and CPU resource consumption can be reduced, but overheads of switches between virtualized contexts (to be specific, exiting from a virtual machine non-root mode to a hypervisor root mode) are increased.

505. The daemon process on the host machine determines a host physical address of to-be-accelerated data according to a virtual machine physical address of the to-be-accelerated data in the information required for performing the acceleration operation and a preset mapping relationship between the virtual machine physical address and the host physical address.

In this embodiment of the present disclosure, the hardware accelerator can recognize only a host physical address (HPA). The memory address transferred by the virtual machine to the daemon process on the host machine is the virtual machine physical address (GPA) of the to-be-accelerated data, and cannot be directly transferred to the hardware accelerator for use.

In the initialization phase, the daemon process on the host machine pre-establishes the mapping relationship between the virtual machine physical address GPA and the host physical address, and when processing the to-be-accelerated data subsequently, may perform address translation only by using the mapping relationship, without performing memory copy (that is, zero copy). For example, the to-be-accelerated data is initially stored in a VM memory corresponding to the GPA; and after establishing the mapping relationship between the GPA and the HPA, the daemon process on the host machine needs to translate the GPA into the HPA only, and can obtain the to-be-accelerated data from a host memory buffer corresponding to the HPA, without copying the to-be-accelerated data in the VM memory to a host memory buffer pre-requested by the host.

506. The daemon process on the host machine queries, from the preset binding relationship between the virtual accelerator and the VF, the target VF bound to the target virtual accelerator.

In this embodiment of the present disclosure, a hardware accelerator supporting an SR-IOV function may obtain a plurality of VFs (Virtual Functions) through virtualization, where each VF corresponds to a hardware accelerator. An Single-Root I/O Virtualization (SR-IOV) technology is a hardware based virtualization solution that can improve performance and scalability. In the SR-IOV standard, sharing of a Peripheral Component Interconnect Express (PCIe) device between virtual machines efficiently is allowed. In addition, the SR-IOV standard is implemented in hardware, and can obtain I/O performance comparable to performance of the host machine.

In the SR-IOV, there are two new function types. A physical function (PF) is a PCI function used to support the SR-IOV function, as defined in the SR-IOV specification. The PF includes an SR-IOV function structure, and is used to manage the SR-IOV function. The PF is a full-featured PCIe function that can be discovered, managed, and processed in the same as any other PCIe device. The PF has all configuration resources, and may be used to configure or control a PCIe device. The VF is a function associated with the physical function. The VF is a lightweight PCIe function, and may share one or more physical resources with the physical function and other VFs associated with the same physical function. The VF is allowed to have configuration resources used only for its own actions.

Each SR-IOV device may have a PF, and a maximum of 64,000 VFs may be associated with each PF. The PF may create a VF by using a register, and the register is designed with an attribute specially used for the purpose.

In this embodiment of the present disclosure, the binding relationship between the virtual accelerator and the VF is already established in the initialization phase. In this case, the daemon process on the host machine may query, from the preset binding relationship between the virtual accelerator and the VF, the target VF bound to the target virtual accelerator.

507. The daemon process on the host machine sends the host physical address of the to-be-accelerated data to the target VF.

Specifically, the daemon process on the host machine may invoke an application programming interface (API) of the hardware accelerator to send the host physical address of the to-be-accelerated data to the target VF. Optionally, the daemon process may further send other parameters required for performing the acceleration operation (for example, the length of the to-be-accelerated data, the initial vector, and the associated data) to the target VF.

508. The target VF obtains, according to the host physical address of the to-be-accelerated data, the to-be-accelerated data from a virtual machine memory corresponding to the virtual machine physical address of the to-be-accelerated data, and performs the acceleration operation on the to-be-accelerated data.

In this embodiment of the present disclosure, after the target VF receives the host physical address of the to-be-accelerated data, a hardware accelerator driver may obtain, according to the HPA of the to-be-accelerated data, the to-be-accelerated data from the virtual machine memory corresponding to the virtual machine physical address of the to-be-accelerated data, and perform the acceleration operation on the to-be-accelerated data.

509. After the to-be-accelerated data undergoes acceleration processing, the daemon process on the host machine adds an identifier of an entry to the virtual input/output ring of the target virtual accelerator according to an identifier of the target virtual accelerator in the binding relationship.

In this embodiment of the present disclosure, because a zero copy technology is used, when delivering the information required for performing the acceleration operation, the VM does not need to copy the to-be-accelerated data in the virtual machine memory corresponding to the GPA, to the host memory buffer corresponding to the HVA. Therefore, the to-be-accelerated data and the acceleration result generated after the to-be-accelerated data undergoes acceleration processing are all stored in the virtual machine memory corresponding to the GPA. The daemon process on the host machine may poll and monitor whether the VF completes the acceleration processing operation on the to-be-accelerated data; and if detecting that the operation is complete, the daemon process on the host machine may add the identifier of the entry to the vring_used table in the virtual input/output ring of the target virtual accelerator according to the identifier of the target virtual accelerator in the binding relationship.

510. The virtual machine monitors the virtual input/output ring of the target virtual accelerator to obtain an acceleration result generated after the to-be-accelerated data undergoes acceleration processing.

Specifically, in this optional implementation, the virtual machine may monitor the vring_used table in the virtual input/output ring of the target virtual accelerator in real time in a polling mode, and if the vring_used table is updated, obtain the identifier of the entry in the vring_used table, where the entry has undergone acceleration. Further, the virtual machine may obtain, from the vring_desc table in the virtual input/output ring according to the identifier of the entry, the virtual machine physical address for storing the acceleration result. Still further, the virtual machine may obtain the acceleration result from a virtual machine memory corresponding to the virtual machine physical address for storing the acceleration result. Optionally, the VNF on the virtual machine may further perform next processing on the acceleration result, for example, send a network packet that undergoes the acceleration operation to an external network.

The manner of automatically monitoring the virtual input/output ring of the target virtual accelerator by the virtual machine helps reduce interrupt overheads and save resources.

In another optional implementation, step 510 may not be performed, but is replaced with the following steps.

(21) The daemon process on the host machine sends an interrupt request carrying the identifier of the target virtual accelerator to the virtual machine corresponding to the target virtual accelerator.

(22) The virtual machine queries the identifier of the entry in the virtual input/output ring of the target virtual accelerator according to the identifier of the target virtual accelerator.

(23) The virtual machine obtains, according to the identifier of the entry, the virtual machine physical address for storing the acceleration result and obtains the acceleration result from the virtual machine memory corresponding to the virtual machine physical address for storing the acceleration result.

In this optional implementation, after the daemon process on the host machine adds the entry that has undergone acceleration to the virtual input/output ring of the target virtual accelerator, the daemon process on the host machine may use an eventfd mechanism of a Linux kernel to send an interrupt request carrying the identifier of the target virtual accelerator to the virtual machine corresponding to the target virtual accelerator. When the virtual machine is created, the QEMU process creates an eventfd (event handler) for the Vring of the virtual accelerator.

After receiving the interrupt request, the virtual machine may stop executing a current program to query the identifier of the entry in the vring_used table in the virtual input/output ring of the target virtual accelerator according to the identifier of the target virtual accelerator, and obtain, from the vring_desc table in the virtual input/output ring of the target virtual accelerator according to the identifier of the entry, the virtual machine physical address for storing the acceleration result. Further, the virtual machine may obtain the acceleration result from the virtual machine corresponding to the virtual machine physical address for storing the acceleration result.

As can be learned, a bidirectional zero copy solution (that is, zero copy in a packet sending direction and zero copy in a packet receiving direction) is used in the sending and receiving directions in this embodiment of the present disclosure. Zero copy is implemented in a whole path of an accelerated data stream, almost without additional CPU consumption. In addition, the solution of the present disclosure reserves advantages of a paravirtualization technology, such as a VM migration capability and VNFC code portability (that is, hardware non-perceptivity). The zero copy in the packet sending direction means that the virtual machine does not need to copy the to-be-accelerated data in the virtual machine memory to the host memory buffer in a process of delivering the information required for performing the acceleration operation to the hardware accelerator. The zero copy in the packet receiving direction means that the acceleration result generated after the hardware accelerator performs acceleration processing on the to-be-accelerated data does not need to be copied from the host memory buffer to the virtual machine memory either. In a whole bidirectional zero copy process in the sending and receiving directions, the to-be-accelerated data and the acceleration result are always stored in the virtual machine memory.

It should be noted that the daemon process on the host machine is applicable to various types of virtual machines.

In the method procedure described in FIG. 5, the information required for performing the acceleration operation and delivered by the virtual machine is encapsulated by using a predefined data structure, and the data structure occupies one entry of the virtual input/output ring of the target virtual accelerator. This can greatly enhance a throughput capability of the virtual input/output ring. Within a unit time, more data packets are transmitted, and therefore data packet transmission efficiency can be improved.

Figure 6A:
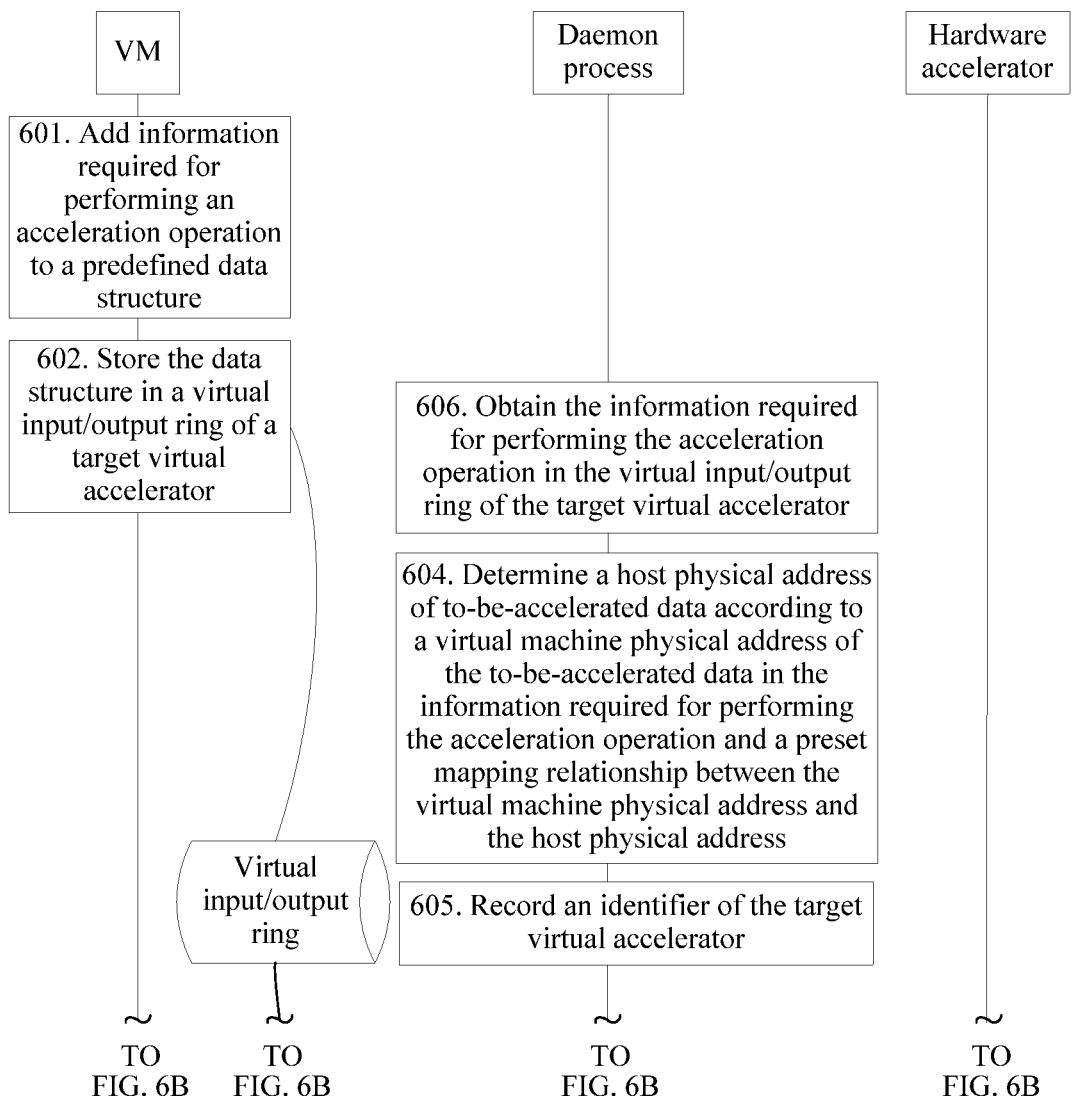
FIG. 6A and FIG. 6B are a schematic flowchart of another data transmission method according to an embodiment of the present disclosure.
Figure 6B:
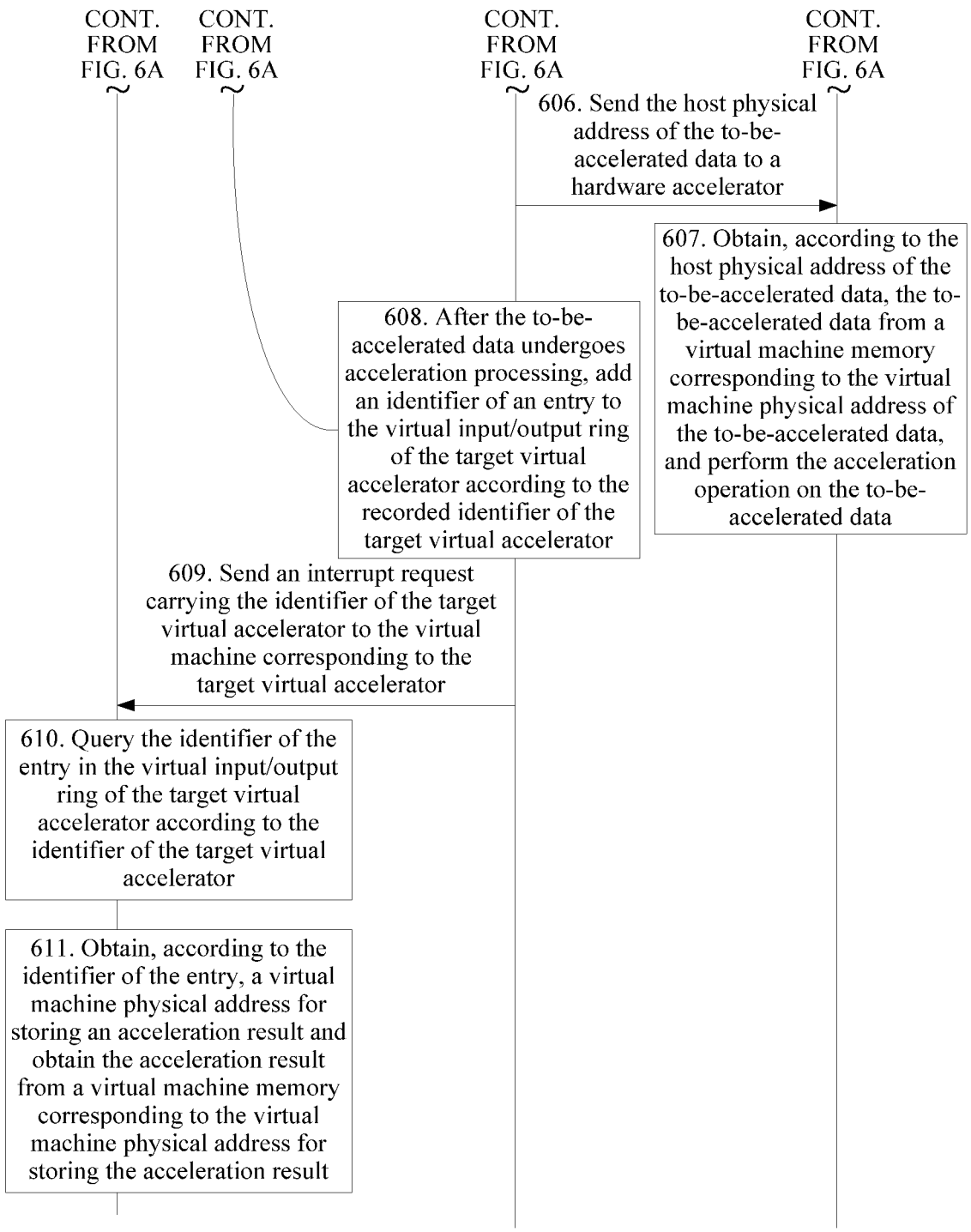

Referring to FIG. 6A and FIG. 6B, FIG. 6A and FIG. 6B are a schematic flowchart of another data transmission method according to an embodiment of the present disclosure. The method is drafted from a plurality of perspectives such as a virtual machine, a daemon process on a host machine, and a hardware accelerator. The method uses a bidirectional copy solution. As shown in FIG. 6A and FIG. 6B, the method may include the following steps.

601. A virtual machine adds information required for performing an acceleration operation to a predefined data structure.

602. The virtual machine puts the information required for performing the acceleration operation into a virtual input/output ring of a target virtual accelerator.

603. A daemon process on a host machine obtains the information required for performing the acceleration operation in the virtual input/output ring of the target virtual accelerator.

604. The daemon process on the host machine determines a host physical address of to-be-accelerated data according to a virtual machine physical address of the to-be-accelerated data in the information required for performing the acceleration operation and a preset mapping relationship between the virtual machine physical address and the host physical address.

605. The daemon process on the host machine records an identifier of the target virtual accelerator.

Specifically, the daemon process on the host machine may record the identifier of the target virtual accelerator in a specified location in a host memory buffer. The specified location in the host memory buffer, may be, for example, space with an offset of four bytes or space with an offset of eight bytes. The host memory buffer is any one requested from a host memory buffer pool in an initialization phase.

606. The daemon process on the host machine sends the host physical address of the to-be-accelerated data to a hardware accelerator.

607. The hardware accelerator obtains, according to the host physical address of the to-be-accelerated data, the to-be-accelerated data from a virtual machine memory corresponding to the virtual machine physical address of the to-be-accelerated data, and performs the acceleration operation on the to-be-accelerated data.

608. After the to-be-accelerated data undergoes acceleration processing, the daemon process on the host machine adds an identifier of an entry to the virtual input/output ring of the target virtual accelerator according to the recorded identifier of the target virtual accelerator.

Specifically, after the to-be-accelerated data undergoes acceleration processing, the daemon process on the host machine may query the identifier of the target virtual accelerator that is recorded in the specified location (such as space with an offset of four bytes) in the host memory buffer, and add the identifier of the entry that has undergone acceleration to a vring_used table in the virtual input/output ring of the target virtual accelerator.

609. The daemon process on the host machine sends an interrupt request carrying the identifier of the target virtual accelerator to the virtual machine corresponding to the target virtual accelerator.

Specifically, the daemon process on the host machine may use an eventfd mechanism of a Linux kernel to send the interrupt request carrying the identifier of the target virtual accelerator to the virtual machine corresponding to the target virtual accelerator. When the virtual machine is created, a QEMU process creates an eventfd (event handler) for the Vring of the virtual accelerator.

610. The virtual machine queries the identifier of the entry in the virtual input/output ring of the target virtual accelerator according to the identifier of the target virtual accelerator.

After receiving the interrupt request, the virtual machine may stop executing a current program to query the identifier of the entry in the vring_used table in the virtual input/output ring of the target virtual accelerator according to the identifier of the target virtual accelerator.

611. The virtual machine obtains, according to the identifier of the entry, a virtual machine physical address for storing an acceleration result and obtains the acceleration result from a virtual machine memory corresponding to the virtual machine physical address for storing the acceleration result.

Specifically, the virtual machine may obtain, from a vring_desc table in the virtual input/output ring of the target virtual accelerator according to the identifier of the entry, the virtual machine physical address for storing the acceleration result, and obtain the acceleration result from the virtual machine memory corresponding to the virtual machine physical address for storing the acceleration result. Optionally, a VNF on the virtual machine may further perform next processing on the acceleration result, for example, send a network packet that undergoes the acceleration operation to an external network.

In another optional implementation, step 609 to step 611 may not be performed, but the following step is performed:

The virtual machine monitors the virtual input/output ring of the target virtual accelerator to obtain the acceleration result generated after the to-be-accelerated data undergoes acceleration processing.

Specifically, in this optional implementation, the VNF on the virtual machine may monitor the vring_used table in the virtual input/output ring of the target virtual accelerator in real time in a polling mode, and if the vring_used table is updated, obtain an identifier of an entry of the vring_desc table that is recorded in the vring_used table, where the entry is a vring_desc entry that has undergone acceleration. Further, the virtual machine may obtain corresponding entry content (to be specific, the data structure for storing the information required for performing the acceleration operation) from the vring_desc table in the virtual input/output ring. Still further, the virtual machine may obtain the acceleration result from the virtual machine memory corresponding to the virtual machine physical address that is recorded in the data structure and used for storing the acceleration result. Optionally, the VNF on the virtual machine may further perform next processing on the acceleration result, for example, send a network packet that undergoes the acceleration operation to an external network.

The manner of automatically monitoring the virtual input/output ring of the target virtual accelerator by the virtual machine helps reduce interrupt overheads and save resources.

In the method procedure described in FIG. 6A and FIG. 6B, the information required for performing the acceleration operation and delivered by the virtual machine is encapsulated by using a predefined data structure, and the data structure occupies one entry of the virtual input/output ring of the target virtual accelerator. This can greatly enhance a throughput capability of the virtual input/output ring. Within a unit time, more data packets are transmitted, and therefore data packet transmission efficiency can be improved. In addition, the hardware accelerator is a single-queue hardware accelerator, and by using the manner of recording the identifier of the target virtual accelerator, zero copy is implemented in a whole path of an accelerated data stream, almost without additional CPU consumption. In addition, the solution of the present disclosure reserves advantages of a paravirtualization technology, such as a VM migration capability and VNFC code portability (that is, hardware non-perceptivity).

Figure 7A:
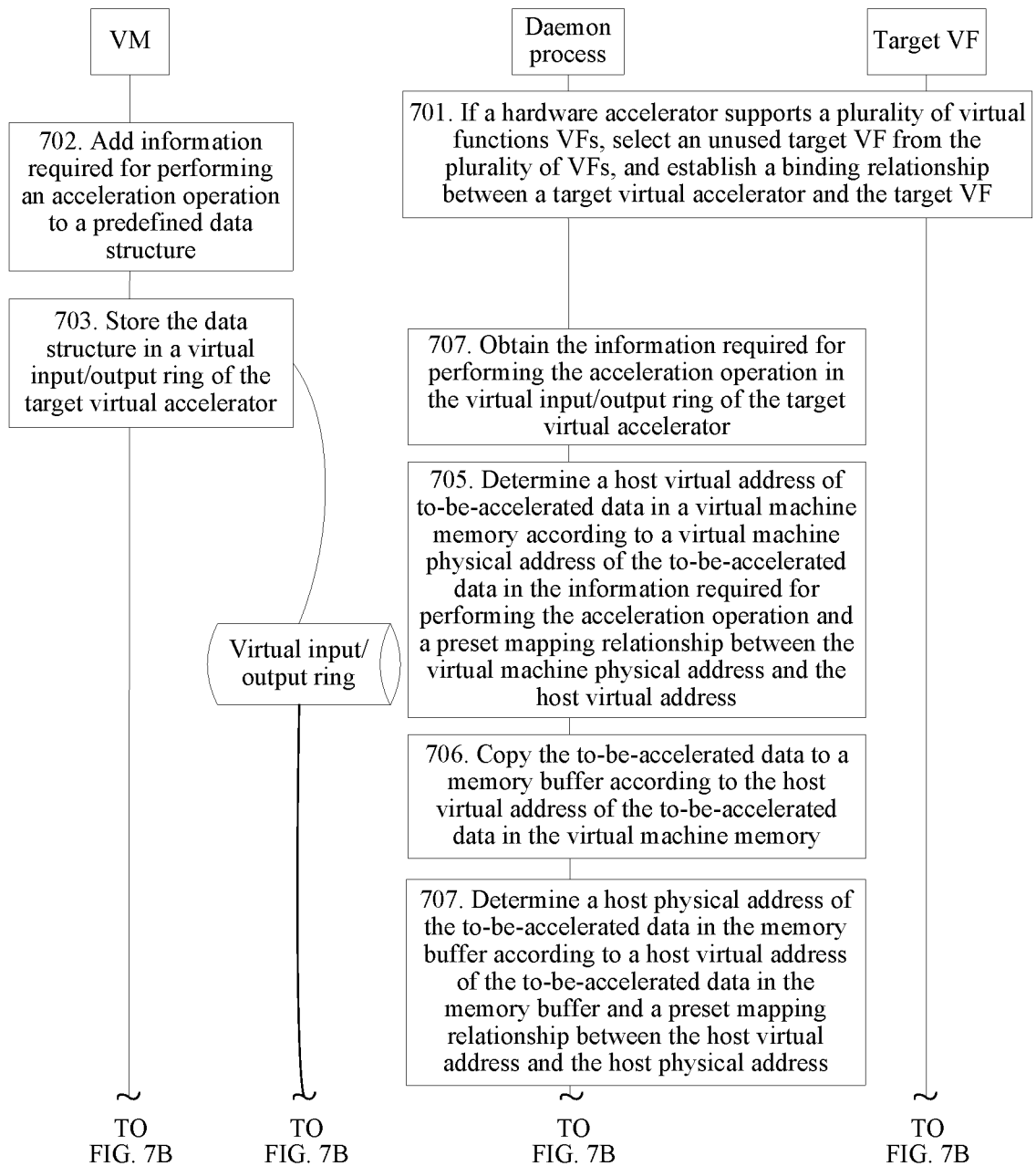
FIG. 7A and FIG. 7B are a schematic flowchart of another data transmission method according to an embodiment of the present disclosure.
Figure 7B:
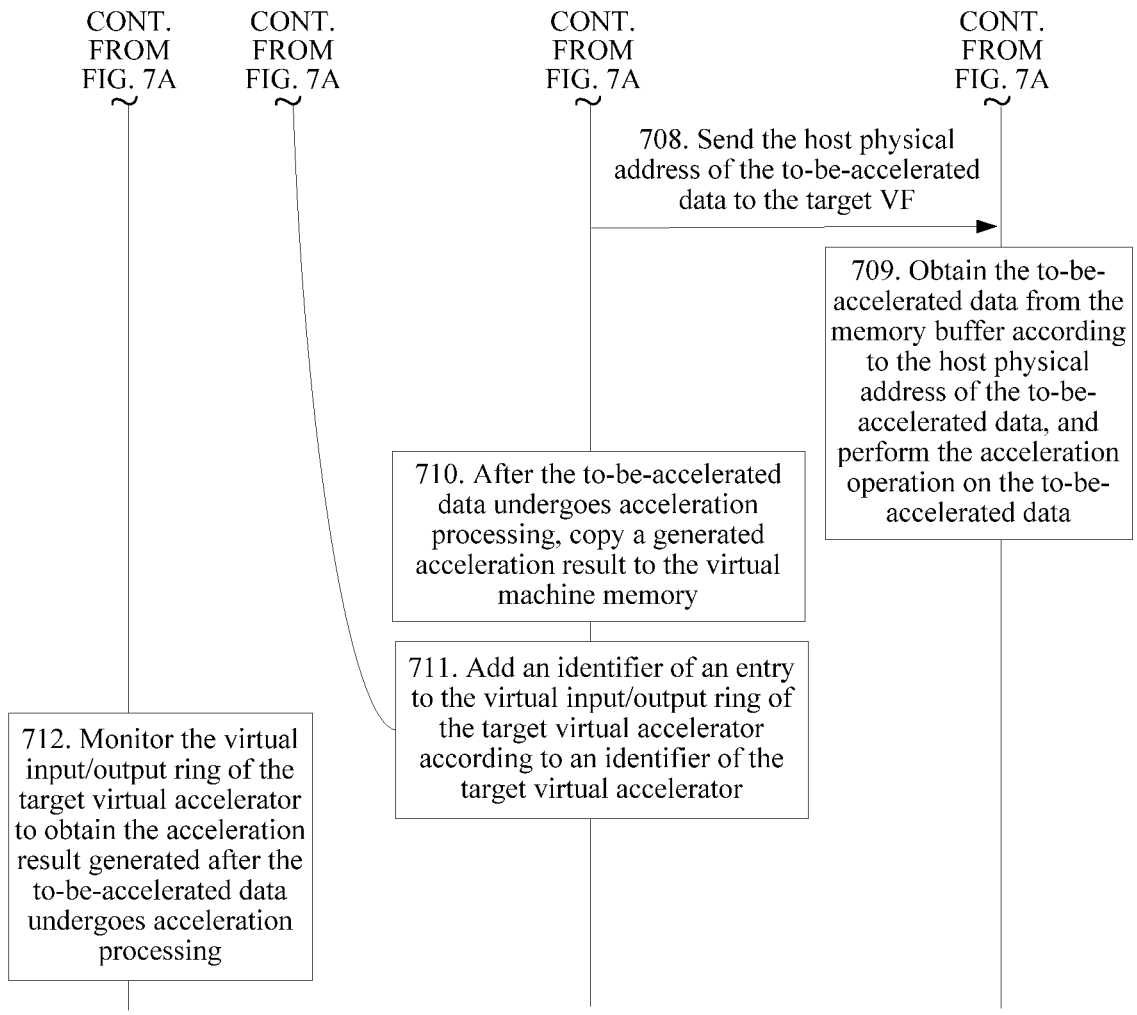

Referring to FIG. 7A and FIG. 7B, FIG. 7A and FIG. 7B are a schematic flowchart of another data transmission method according to an embodiment of the present disclosure. The method is drafted from a plurality of perspectives such as a virtual machine, a daemon process on a host machine, and a hardware accelerator. The method uses a bidirectional copy solution. As shown in FIG. 7A and FIG. 7B, the method may include the following steps.

701. If a hardware accelerator supports a plurality of virtual functions VFs, a daemon process on a host machine selects an unused target VF from the plurality of VFs, and establishes a binding relationship between a target virtual accelerator and the target VF.

702. A virtual machine adds information required for performing an acceleration operation to a predefined data structure.

703. The virtual machine stores the data structure in a virtual input/output ring of the target virtual accelerator.

704. The daemon process on the host machine obtains the information required for performing the acceleration operation in the virtual input/output ring of the target virtual accelerator.

705. The daemon process on the host machine determines a host virtual address of to-be-accelerated data in a virtual machine memory according to a virtual machine physical address of the to-be-accelerated data in the information required for performing the acceleration operation and a preset mapping relationship between the virtual machine physical address and the host virtual address.

In this embodiment of the present disclosure, the daemon process on the host machine can recognize only the HVA, but cannot recognize the GPA. Therefore, in an initialization phase, the mapping relationship between the GPA and the HVA is pre-established. After obtaining the GPA of the to-be-accelerated data, the daemon process on the host machine may determine the host virtual address of the to-be-accelerated data according to the preset mapping relationship between the virtual machine physical address and the host virtual address.

It should be noted that, in this embodiment of the present disclosure, in the initialization phase, a mapping relationship between the virtual machine physical address GPA and an HPA is not established, and only the mapping relationship between the GPA and the HVA is established.

706. The daemon process on the host machine copies the to-be-accelerated data to a host memory buffer according to the host virtual address of the to-be-accelerated data in the virtual machine memory.

In this embodiment of the present disclosure, because the mapping relationship between the GPA and the HPA is not established, the daemon process on the host machine needs to copy the to-be-accelerated data to the host memory buffer according to the host virtual address of the to-be-accelerated data in the virtual machine memory to facilitate subsequent address translation.

707. The daemon process on the host machine determines a host physical address of the to-be-accelerated data in the host memory buffer according to a host virtual address of the to-be-accelerated data in the host memory buffer and a preset mapping relationship between the host virtual address and the host physical address.

In this embodiment of the present disclosure, in the initialization phase, the mapping relationship between the GPA and the HPA is not established, but the hardware accelerator can recognize only the HPA of the to-be-accelerated data. The daemon process on the host machine needs to translate the h HVA of the to-be-accelerated data in the host memory buffer into the HPA of the to-be-accelerated data that can be recognized by the hardware accelerator in the host memory buffer.

Specifically, the daemon process on the host machine may query, in a Linux system according to a /proc/pid/pagemap file, the HPA corresponding to the HVA of the to-be-accelerated data in the host memory buffer.

708. The daemon process on the host machine sends the host physical address of the to-be-accelerated data to the target VF.

709. The target VF obtains, according to the host physical address of the to-be-accelerated data, the to-be-accelerated data from the virtual machine memory corresponding to the virtual machine physical address of the to-be-accelerated data, and performs the acceleration operation on the to-be-accelerated data.

710. After the to-be-accelerated data undergoes acceleration processing, the daemon process on the host machine copies a generated acceleration result to the virtual machine memory.

Specifically, after the to-be-accelerated data undergoes acceleration processing, the daemon process on the host machine further needs to copy the generated acceleration result from the host memory buffer to the virtual machine memory, so that the virtual machine obtains the acceleration result from the virtual machine memory subsequently.

711. The daemon process on the host machine adds an identifier of an entry to the virtual input/output ring of the target virtual accelerator according to an identifier of the target virtual accelerator.

712. The virtual machine monitors the virtual input/output ring of the target virtual accelerator to obtain the acceleration result generated after the to-be-accelerated data undergoes acceleration processing.

In the method procedure described in FIG. 7A and FIG. 7B, the information required for performing the acceleration operation and delivered by the virtual machine is encapsulated by using a predefined data structure, and the data structure occupies one entry of the virtual input/output ring of the target virtual accelerator. This can greatly enhance a throughput capability of the virtual input/output ring. Within a unit time, more data packets are transmitted, and therefore data packet transmission efficiency can be improved.

Figure 8:
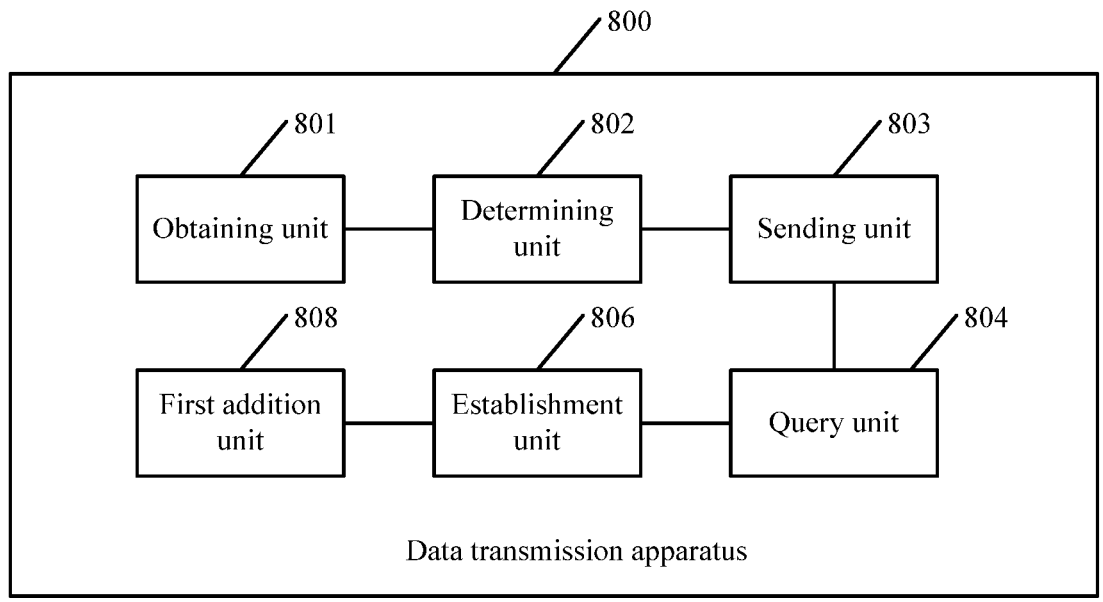
FIG. 8 is a schematic structural diagram of a data transmission apparatus according to an embodiment of the present disclosure.

Referring to FIG. 8, FIG. 8 is a schematic structural diagram of a data transmission apparatus according to an embodiment of the present disclosure. The data transmission apparatus 800 may be configured to perform all or some steps in the data transmission method disclosed in FIG. 5. For details, refer to the descriptions about FIG. 5. Details are not described again herein. As shown in FIG. 8, the data transmission apparatus 800 may include:

an obtaining unit 801, configured to obtain information required for performing an acceleration operation in a virtual input/output ring of a target virtual accelerator, where the information required for performing the acceleration operation uses a predefined data structure, and the data structure occupies one entry of the virtual input/output ring of the target virtual accelerator, where the information required for performing the acceleration operation includes a virtual machine physical address of to-be-accelerated data, a length of the to-be-accelerated data, a virtual machine physical address for storing an acceleration result, and an acceleration type parameter;

a determining unit 802, configured to determine, according to the information required for performing the acceleration operation, information that can be recognized by the hardware accelerator; and a sending unit 803, configured to send the information that can be recognized by the hardware accelerator to the hardware accelerator, where the hardware accelerator is configured to obtain the to-be-accelerated data according to the information that can be recognized by the hardware accelerator and perform the acceleration operation on the to-be-accelerated data.

In an optional implementation, a manner of determining, by the determining unit 802 according to the information required for performing the acceleration operation, the information that can be recognized by the hardware accelerator is specifically:

determining a host physical address of the to-be-accelerated data according to the virtual machine physical address of the to-be-accelerated data in the information required for performing the acceleration operation and a preset mapping relationship between the virtual machine physical address and the host physical address; and a manner of sending, by the sending unit 803, the information that can be recognized by the hardware accelerator to the hardware accelerator is specifically:

sending the host physical address of the to-be-accelerated data to the hardware accelerator; where the hardware accelerator is configured to obtain, according to the host physical address of the to-be-accelerated data, the to-be-accelerated data from a virtual machine memory corresponding to the virtual machine physical address of the to-be-accelerated data, and perform the acceleration operation on the to-be-accelerated data.

In an optional implementation, the hardware accelerator supports a plurality of virtual functions VFs, and the data transmission apparatus 800 shown in FIG. 8 further includes:

a query unit 804, configured to query, from a preset binding relationship between a virtual accelerator and a VF after the determining unit 802 determines the host physical address of the to-be-accelerated data, a target VF bound to the target virtual accelerator; and a manner of sending, by the sending unit 803, the host physical address of the to-be-accelerated data to the hardware accelerator is specifically:

sending the host physical address of the to-be-accelerated data to the target VF, where the target VF is configured to obtain, according to the host physical address of the to-be-accelerated data, the to-be-accelerated data from the virtual machine memory corresponding to the virtual machine physical address of the to-be-accelerated data, and perform the acceleration operation on the to-be-accelerated data.

In another optional implementation, the data transmission apparatus 800 shown in FIG. 8 further includes:

a first addition unit 808, configured to add an identifier of the entry to the virtual input/output ring of the target virtual accelerator according to an identifier of the target virtual accelerator in the binding relationship after the to-be-accelerated data undergoes acceleration processing.

In another optional implementation, the data transmission apparatus 800 shown in FIG. 8 further includes:

an establishment unit 806, configured to: before the obtaining unit 801 obtains the information required for performing the acceleration operation in the virtual input/output ring of the target virtual accelerator, if the hardware accelerator supports a plurality of virtual functions VFs, select an unused target VF from the plurality of VFs, and establish a binding relationship between the target virtual accelerator and the target VF.

In an optional implementation, the sending unit 803 is further configured to send an interrupt request carrying the identifier of the target virtual accelerator to a virtual machine corresponding to the target virtual accelerator, to trigger the virtual machine to query the identifier of the entry in the virtual input/output ring of the target virtual accelerator according to the identifier of the target virtual accelerator and obtain the acceleration result generated after the to-be-accelerated data undergoes acceleration processing.

Figure 9:
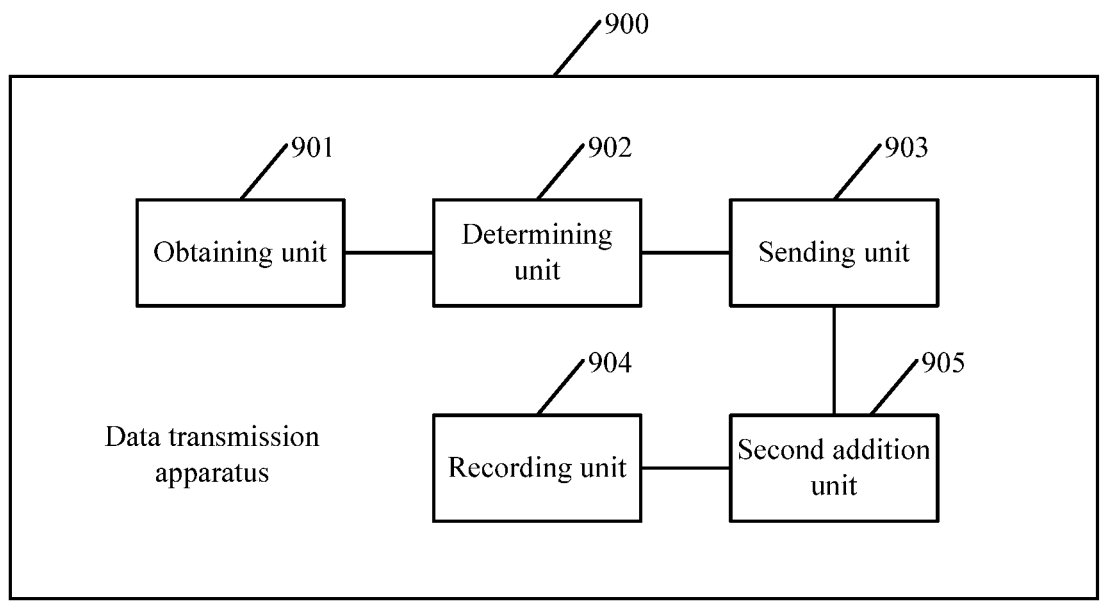
FIG. 9 is a schematic structural diagram of another data transmission apparatus according to an embodiment of the present disclosure.

Referring to FIG. 9, FIG. 9 is a schematic structural diagram of another data transmission apparatus according to an embodiment of the present disclosure. The data transmission apparatus 900 may be configured to perform all or some steps in the data transmission method disclosed in FIG. 6A and FIG. 6B. For details, refer to the descriptions about FIG. 6A and FIG. 6B. Details are not described again herein. As shown in FIG. 9, the data transmission apparatus 900 may include:

an obtaining unit 901, configured to obtain information required for performing an acceleration operation in a virtual input/output ring of a target virtual accelerator, where the information required for performing the acceleration operation uses a predefined data structure, and the data structure occupies one entry of the virtual input/output ring of the target virtual accelerator, where the information required for performing the acceleration operation includes a virtual machine physical address of to-be-accelerated data, a length of the to-be-accelerated data, a virtual machine physical address for storing an acceleration result, and an acceleration type parameter;

a determining unit 902, configured to determine, according to the information required for performing the acceleration operation, information that can be recognized by the hardware accelerator; and a sending unit 903, configured to send the information that can be recognized by the hardware accelerator to the hardware accelerator, where the hardware accelerator is configured to obtain the to-be-accelerated data according to the information that can be recognized by the hardware accelerator and perform the acceleration operation on the to-be-accelerated data.

In an optional implementation, the data transmission apparatus 900 shown in FIG. 9 further includes:

a recording unit 904, configured to record an identifier of the target virtual accelerator before the sending unit 903 sends a host physical address of the to-be-accelerated data to the hardware accelerator.

In an optional implementation, the data transmission apparatus 900 shown in FIG. 9 further includes:

a second addition unit 905, configured to add an identifier of the entry to the virtual input/output ring of the target virtual accelerator according to the recorded identifier of the target virtual accelerator after the to-be-accelerated data undergoes acceleration processing.

In an optional implementation, the sending unit 903 is further configured to send an interrupt request carrying the identifier of the target virtual accelerator to a virtual machine corresponding to the target virtual accelerator, to trigger the virtual machine to query the identifier of the entry in the virtual input/output ring of the target virtual accelerator according to the identifier of the target virtual accelerator and obtain the acceleration result generated after the to-be-accelerated data undergoes acceleration processing.

Figure 10:
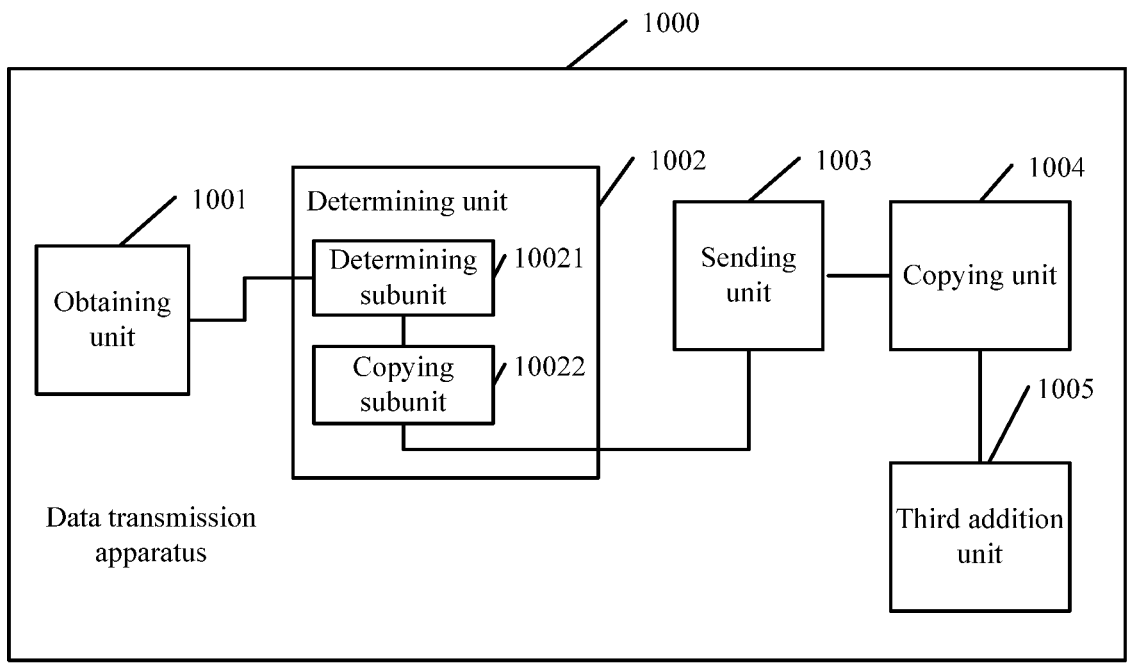
FIG. 10 is a schematic structural diagram of another data transmission apparatus according to an embodiment of the present disclosure.

Referring to FIG. 10, FIG. 10 is a schematic structural diagram of another data transmission apparatus according to an embodiment of the present disclosure. The data transmission apparatus 1000 may be configured to perform some steps in the data transmission method disclosed in FIG. 5 or FIG. 7A and FIG. 7B. For details, refer to the descriptions about FIG. 5 or FIG. 7A and FIG. 7B. Details are not described again herein. As shown in FIG. 10, the data transmission apparatus 1000 may include:

an obtaining unit 1001, configured to obtain information required for performing an acceleration operation in a virtual input/output ring of a target virtual accelerator, where the information required for performing the acceleration operation uses a predefined data structure, and the data structure occupies one entry of the virtual input/output ring of the target virtual accelerator;

the information required for performing the acceleration operation includes a virtual machine physical address of to-be-accelerated data, a length of the to-be-accelerated data, a virtual machine physical address for storing an acceleration result, and an acceleration type parameter;

a determining unit 1002, configured to determine, according to the information required for performing the acceleration operation, information that can be recognized by the hardware accelerator; and a sending unit 1003, configured to send the information that can be recognized by the hardware accelerator to the hardware accelerator, where the hardware accelerator is configured to obtain the to-be-accelerated data according to the information that can be recognized by the hardware accelerator and perform the acceleration operation on the to-be-accelerated data.

In an optional implementation, the determining unit 1002 includes:

a determining subunit 10021, configured to determine a host virtual address of the to-be-accelerated data in a virtual machine memory according to the virtual machine physical address of the to-be-accelerated data in the information required for performing the acceleration operation and a preset mapping relationship between the virtual machine physical address and the host virtual address; and a copying subunit 10022, configured to copy the to-be-accelerated data to a host memory buffer according to the host virtual address of the to-be-accelerated data in the virtual machine memory; where the determining subunit 10021 is further configured to determine a host physical address of the to-be-accelerated data in the host memory buffer according to a host virtual address of the to-be-accelerated data in the host memory buffer and a preset mapping relationship between the host virtual address and the host physical address; and the sending unit 1003 is specifically configured to send the host physical address of the to-be-accelerated data to the hardware accelerator; where the hardware accelerator is configured to obtain the to-be-accelerated data from the host memory buffer according to the host physical address of the to-be-accelerated data, and perform the acceleration operation on the to-be-accelerated data.

In an optional implementation, the data transmission apparatus 1000 shown in FIG. 10 further includes:

a copying unit 1004, configured to copy the generated acceleration result to the virtual machine memory after the to-be-accelerated data undergoes acceleration processing; and a third addition unit 1005, configured to add an identifier of the entry to the virtual input/output ring of the target virtual accelerator according to an identifier of the target virtual accelerator.

In an optional implementation, the sending unit 1003 is further configured to send an interrupt request carrying the identifier of the target virtual accelerator to a virtual machine corresponding to the target virtual accelerator, to trigger the virtual machine to query the identifier of the entry in the virtual input/output ring of the target virtual accelerator according to the identifier of the target virtual accelerator and obtain the acceleration result generated after the to-be-accelerated data undergoes acceleration processing.

In the data transmission apparatus described in FIG. 8 to FIG. 10, the information required for performing the acceleration operation and delivered by the virtual machine is still encapsulated by using a predefined data structure, and the data structure occupies one entry of the virtual input/output ring of the target virtual accelerator. This can greatly enhance a throughput capability of the virtual input/output ring. Within a unit time, more data packets are transmitted, and therefore data packet transmission efficiency can be improved.

Figure 11:
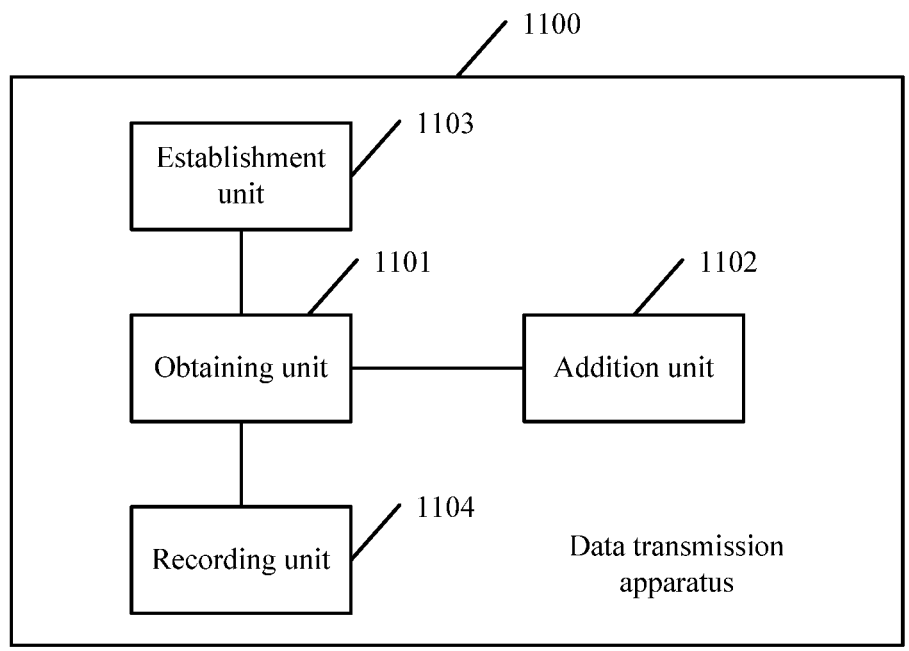
FIG. 11 is a schematic structural diagram of another data transmission apparatus according to an embodiment of the present disclosure.

Referring to FIG. 11, FIG. 11 is a schematic structural diagram of another data transmission apparatus according to an embodiment of the present disclosure. The data transmission apparatus 1100 may be configured to perform some steps in the data transmission method disclosed in FIG. 5 or FIG. 6A and FIG. 6B. For details, refer to the descriptions about FIG. 5 or FIG. 6A and FIG. 6B. Details are not described again herein. As shown in FIG. 11, the data transmission apparatus 1100 may include:

an obtaining unit 1101, configured to obtain an identifier of a target virtual accelerator after to-be-accelerated data undergoes acceleration processing; and an addition unit 1102, configured to add an identifier of at least one entry to a virtual input/output ring of the target virtual accelerator according to the identifier of the target virtual accelerator, so that a virtual machine corresponding to the target virtual accelerator obtains, according to the identifier of the at least one entry, an acceleration result generated after the to-be-accelerated data undergoes acceleration processing, where the at least one entry stores information required for performing an acceleration operation on the to-be-accelerated data.

Optionally, the hardware accelerator supports a plurality of VFs, and the data transmission apparatus 1100 shown in FIG. 11 further includes:

an establishment unit 1103, configured to: before the obtaining unit 1101 obtains the identifier of the target virtual accelerator after the to-be-accelerated data undergoes acceleration processing, select an unused target VF from the plurality of VFs, and establish a binding relationship between the target virtual accelerator and the target VF; where the identifier of the target virtual accelerator is obtained based on the binding relationship.

Optionally, the data transmission apparatus 1100 shown in FIG. 11 further includes:

a recording unit 1104, configured to record the identifier of the target virtual accelerator before the obtaining unit obtains the identifier of the target virtual accelerator after the to-be-accelerated data undergoes acceleration processing.

A manner of adding the identifier of the at least one entry to the virtual input/output ring of the target virtual accelerator by the addition unit 1102 according to the identifier of the target virtual accelerator, so that the virtual machine corresponding to the target virtual accelerator obtains, according to the identifier of the at least one entry, the acceleration result generated after the to-be-accelerated data undergoes acceleration processing, is specifically:

adding the identifier of the at least one entry to the virtual input/output ring of the target virtual accelerator according to the identifier of the target virtual accelerator, and sending an interrupt request carrying the identifier of the target virtual accelerator to the virtual machine corresponding to the target virtual accelerator, so that the virtual machine, in response to the interrupt request, queries the identifier of the at least one entry in the virtual input/output ring of the target virtual accelerator and obtains the acceleration result generated after the to-be-accelerated data undergoes acceleration processing; or adding the identifier of the at least one entry to the virtual input/output ring of the target virtual accelerator according to the identifier of the target virtual accelerator, so that the virtual machine corresponding to the target virtual accelerator monitors the virtual input/output ring of the target virtual accelerator and obtains, according to the identifier of the at least one entry in the virtual input/output ring of the target virtual accelerator, the acceleration result generated after the to-be-accelerated data undergoes acceleration processing.

In the data transmission apparatus 1100 described in FIG. 11, the data structure used by the information required for performing the acceleration operation occupies at least one entry of the virtual input/output ring of the target virtual accelerator, and a bidirectional zero copy solution is used in a sending direction and a receiving direction. Although a throughput capability of the virtual input/output ring cannot be enhanced in this manner, memory copy is not required in the sending direction and the receiving direction. In comparison with the prior art, CPU resource consumption can be reduced.

Figure 12:
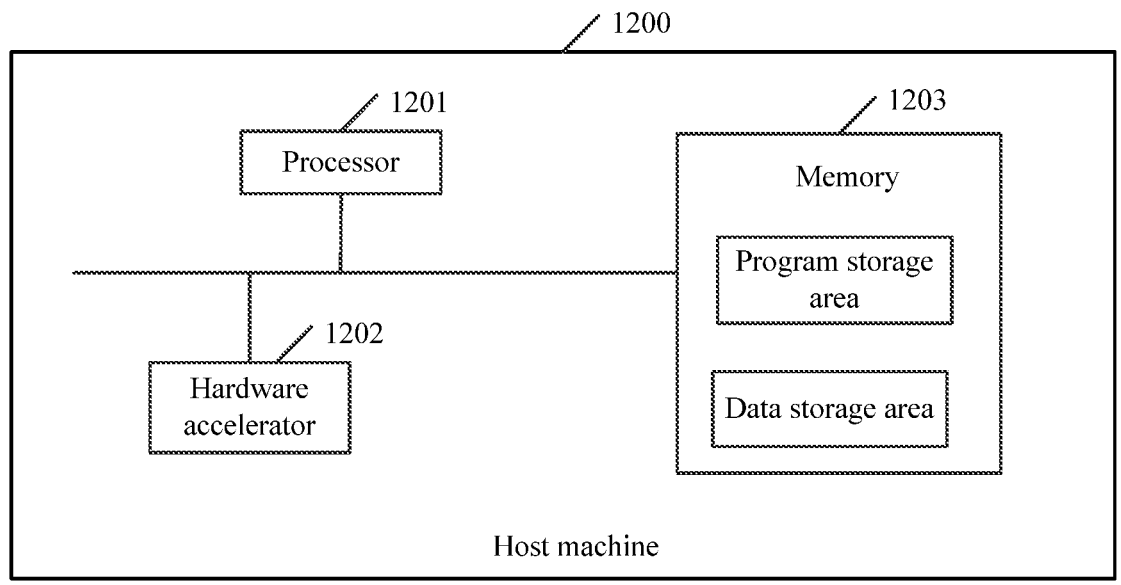
FIG. 12 is a schematic structural diagram of a host machine according to an embodiment of the present disclosure.

Referring to FIG. 12, FIG. 12 is a schematic structural diagram of a host machine according to an embodiment of the present disclosure. The host machine 1200 may be configured to perform all or some steps in the data transmission method disclosed in FIG. 5 to FIG. 7A and FIG. 7B. For details, refer to the descriptions about FIG. 5 to FIG. 7A and FIG. 7B. Details are not described again herein. As shown in FIG. 12, the host machine 1200 may include at least one processor 1201, for example, a Central Processing Unit (CPU), a hardware accelerator 1202, and a memory 1203, where the processor 1201, the hardware accelerator 1202, and the memory 1203 are respectively connected to a communications bus. The memory 1203 may be a high-speed RAM memory, or may be a non-volatile memory. A person skilled in the art may understand that the structure of the host machine 1200 shown in FIG. 12 does not constitute a limitation on the present disclosure. The structure may be a bus structure, or may be a star structure. Further, a quantity of parts included may be greater or less than that shown in the FIG. 12, or some parts are combined, or arrangements of parts are different.

The processor 1201 is a control center of the host machine 1200, and may be a CPU. The processor 1201 connects various parts of the host machine 1200 by using various interfaces and lines, and is configured to perform the following operations by running or executing a software program and/or module stored in the memory 1203 and invoking program code stored in the memory 1203:

obtaining information required for performing an acceleration operation in a virtual input/output ring of a target virtual accelerator, where the information required for performing the acceleration operation uses a predefined data structure, and the data structure occupies one entry of the virtual input/output ring of the target virtual accelerator;

determining, according to the information required for performing the acceleration operation, information that can be recognized by the hardware accelerator; and sending the information that can be recognized by the hardware accelerator to the hardware accelerator, where the hardware accelerator is configured to obtain to-be-accelerated data according to the information that can be recognized by the hardware accelerator and perform the acceleration operation on the to-be-accelerated data.

The information required for performing the acceleration operation includes a virtual machine physical address of to-be-accelerated data, a length of the to-be-accelerated data, a virtual machine physical address for storing an acceleration result, and an acceleration type parameter.

Optionally, a manner of determining, by the processor 1201 according to the information required for performing the acceleration operation, the information that can be recognized by the hardware accelerator is specifically:

determining a host physical address of the to-be-accelerated data according to the virtual machine physical address of the to-be-accelerated data in the information required for performing the acceleration operation and a preset mapping relationship between the virtual machine physical address and the host physical address; and a manner of sending, by the processor 1201, the information that can be recognized by the hardware accelerator to the hardware accelerator is specifically: sending the host physical address of the to-be-accelerated data to the hardware accelerator; where the hardware accelerator is configured to obtain, according to the host physical address of the to-be-accelerated data, the to-be-accelerated data from a virtual machine memory corresponding to the virtual machine physical address of the to-be-accelerated data, and perform the acceleration operation on the to-be-accelerated data.

Optionally, the hardware accelerator supports a plurality of VFs; after determining the host physical address of the to-be-accelerated data, the processor 1201 may further invoke the program code stored in the memory 1203 to perform the following operation:

querying, from a preset binding relationship between a virtual accelerator and a VF, a target VF bound to the target virtual accelerator; and the sending, by the processor 1201, the host physical address of the to-be-accelerated data to the hardware accelerator includes:

sending the host physical address of the to-be-accelerated data to the target VF, where the target VF is configured to obtain, according to the host physical address of the to-be-accelerated data, the to-be-accelerated data from the virtual machine memory corresponding to the virtual machine physical address of the to-be-accelerated data, and perform the acceleration operation on the to-be-accelerated data.

Optionally, the processor 1201 may further invoke the program code stored in the memory 1203 to perform the following operation:

after the to-be-accelerated data undergoes acceleration processing, adding an identifier of the entry to the virtual input/output ring of the target virtual accelerator according to an identifier of the target virtual accelerator in the binding relationship.

Optionally, before the processor 1201 obtains the information required for performing the acceleration operation in the virtual input/output ring of the target virtual accelerator, the processor 1201 may further invoke the program code stored in the memory 1203 to perform the following operation:

if the hardware accelerator supports a plurality of virtual functions VFs, selecting an unused target VF from the plurality of VFs, and establishing a binding relationship between the target virtual accelerator and the target VF.

Optionally, before sending the host physical address of the to-be-accelerated data to the hardware accelerator, the processor 1201 may further invoke the program code stored in the memory 1203 to perform the following operation:

recording an identifier of the target virtual accelerator.

Optionally, the processor 1201 may further invoke the program code stored in the memory 1203 to perform the following operations:

after the to-be-accelerated data undergoes acceleration processing, adding an identifier of the entry to the virtual input/output ring of the target virtual accelerator according to the recorded identifier of the target virtual accelerator.

Optionally, a manner of determining, by the processor 1201 according to the information required for performing the acceleration operation, the information that can be recognized by the hardware accelerator is specifically:

determining a host virtual address of the to-be-accelerated data in a virtual machine memory according to the virtual machine physical address of the to-be-accelerated data in the information required for performing the acceleration operation and a preset mapping relationship between the virtual machine physical address and the host virtual address;

copying the to-be-accelerated data to a host memory buffer according to the host virtual address of the to-be-accelerated data in the virtual machine memory; and determining a host physical address of the to-be-accelerated data in the host memory buffer according to a host virtual address of the to-be-accelerated data in the host memory buffer and a preset mapping relationship between the host virtual address and the host physical address; and the sending, by the processor 1201, the information that can be recognized by the hardware accelerator to the hardware accelerator includes:

sending the host physical address of the to-be-accelerated data to the hardware accelerator; where the hardware accelerator is configured to obtain the to-be-accelerated data from the host memory buffer according to the host physical address of the to-be-accelerated data, and perform the acceleration operation on the to-be-accelerated data.

Optionally, the processor 1201 may further invoke the program code stored in the memory 1203 to perform the following operations:

after the to-be-accelerated data undergoes acceleration processing, copying the generated acceleration result to the virtual machine memory; and adding an identifier of the entry to the virtual input/output ring of the target virtual accelerator according to an identifier of the target virtual accelerator.

Optionally, after the processor 1201 adds the identifier of the entry to the virtual input/output ring of the target virtual accelerator, the processor 1201 may further invoke the program code stored in the memory 1203 to perform the following operation:

sending an interrupt request carrying the identifier of the target virtual accelerator to a virtual machine corresponding to the target virtual accelerator, to trigger the virtual machine to query the identifier of the entry in the virtual input/output ring of the target virtual accelerator according to the identifier of the target virtual accelerator and obtain the acceleration result generated after the to-be-accelerated data undergoes acceleration processing.

In the host machine described in FIG. 12, the information required for performing the acceleration operation and delivered by the virtual machine still uses a predefined data structure, and the data structure occupies one entry of the virtual input/output ring of the target virtual accelerator. This can greatly enhance a throughput capability of the virtual input/output ring. Within a unit time, more data packets are transmitted, and therefore data packet transmission efficiency can be improved.

Figure 13:
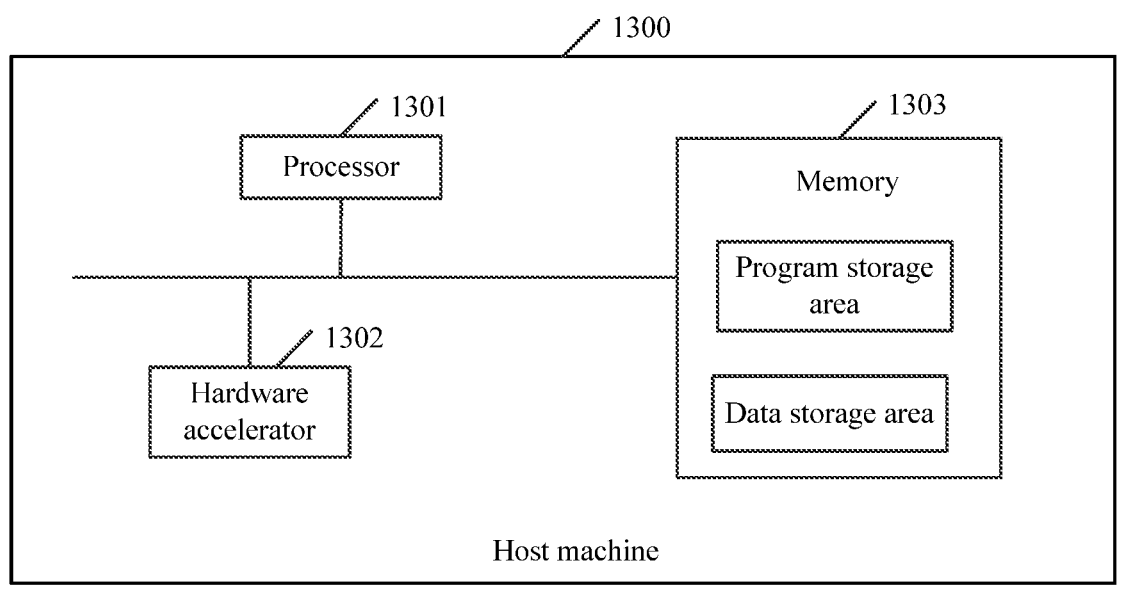
FIG. 13 is a schematic structural diagram of another host machine according to an embodiment of the present disclosure.

Referring to FIG. 13, FIG. 13 is a schematic structural diagram of another host machine according to an embodiment of the present disclosure. The host machine 1300 may be configured to perform all or some steps in the data transmission method disclosed in FIG. 5 to FIG. 7A and FIG. 7B. For details, refer to the descriptions about FIG. 5 to FIG. 7A and FIG. 7B. Details are not described again herein. As shown in FIG. 13, the host machine 1300 may include at least one processor 1301, for example, a CPU, a hardware accelerator 1302, and a memory 1303, where the processor 1301, the hardware accelerator 1302, and the memory 1303 are respectively connected to a communications bus. The memory 1303 may be a high-speed RAM memory, or may be a non-volatile memory. A person skilled in the art may understand that the structure of the host machine 1300 shown in FIG. 13 does not constitute a limitation on the present disclosure. The structure may be a bus structure, or may be a star structure. Further, a quantity of parts included may be greater or less than that shown in the FIG. 13, or some parts are combined, or arrangements of parts are different.

The processor 1301 is a control center of the host machine 1300, and may be a CPU. The processor 1301 connects various parts of the host machine 1300 by using various interfaces and lines, and is configured to perform the following operations by running or executing a software program and/or module stored in the memory 1303 and invoking program code stored in the memory 1303:

obtaining an identifier of a target virtual accelerator after to-be-accelerated data undergoes acceleration processing; and adding an identifier of at least one entry to a virtual input/output ring of the target virtual accelerator according to the identifier of the target virtual accelerator, so that a virtual machine corresponding to the target virtual accelerator obtains, according to the identifier of the at least one entry, an acceleration result generated after the to-be-accelerated data undergoes acceleration processing, where the entry stores information required for performing an acceleration operation on the to-be-accelerated data.

Optionally, the hardware accelerator supports a plurality of virtual functions VFs; and before the processor 1301 obtains the identifier of the target virtual accelerator after the to-be-accelerated data undergoes acceleration processing, the processor 1301 may further invoke the program code stored in the memory 1303 to perform the following operation:

selecting an unused target VF from the plurality of VFs, and establishing a binding relationship between the target virtual accelerator and the target VF; where the identifier of the target virtual accelerator is obtained based on the binding relationship.

Optionally, before the processor 1301 obtains the identifier of the target virtual accelerator after the to-be-accelerated data undergoes acceleration processing, the processor 1301 may further invoke the program code stored in the memory 1303 to perform the following operation:

recording the identifier of the target virtual accelerator.

Optionally, a manner of adding the identifier of the at least one entry to the virtual input/output ring of the target virtual accelerator by the processor 1301 according to the identifier of the target virtual accelerator, so that the virtual machine corresponding to the target virtual accelerator obtains, according to the identifier of the at least one entry, the acceleration result generated after the to-be-accelerated data undergoes acceleration processing, is specifically:

adding the identifier of the at least one entry to the virtual input/output ring of the target virtual accelerator according to the identifier of the target virtual accelerator, and sending an interrupt request carrying the identifier of the target virtual accelerator to the virtual machine corresponding to the target virtual accelerator, so that the virtual machine, in response to the interrupt request, queries the identifier of the at least one entry in the virtual input/output ring of the target virtual accelerator and obtains the acceleration result generated after the to-be-accelerated data undergoes acceleration processing; or adding the identifier of the at least one entry to the virtual input/output ring of the target virtual accelerator according to the identifier of the target virtual accelerator, so that the virtual machine corresponding to the target virtual accelerator monitors the virtual input/output ring of the target virtual accelerator and obtains, according to the identifier of the at least one entry in the virtual input/output ring of the target virtual accelerator, the acceleration result generated after the to-be-accelerated data undergoes acceleration processing.

In the host machine described in FIG. 13, the to-be-accelerated data is initially stored in a virtual machine memory, and the acceleration result generated after the to-be-accelerated data undergoes acceleration processing is also stored in the virtual machine memory. Copy is not performed in a whole process, and CPU resource occupation is reduced.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments and the involved actions and units are not necessarily required by this application.

In the foregoing embodiments, the description of each embodiment has respective focuses. For a part that is not described in detail in an embodiment, reference may be made to related descriptions in other embodiments.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A data transmission method applied to a host machine comprising a hardware accelerator, wherein the method comprises:
    obtaining information required to perform an acceleration operation in a virtual input/output ring (Vring) of a target virtual accelerator, wherein the information required to perform the acceleration operation comprises a virtual machine address of to-be-accelerated data and a length of the to-be-accelerated data, wherein the Vring of the target virtual accelerator includes three tables:
        a vring_desc table comprising entries that store information required to perform the acceleration operation;
        a vring_avail table specifying entries that are available in the vring_desc table; and
        a vring_used table specifying entries in the vring_desc table that have already been delivered to hardware, wherein at least the virtual machine address of to-be-accelerated data and the length of the to-be-accelerated data are encapsulated using a predefined data structure, and wherein the predefined data structure occupies only one entry of the vring_desc table; and
    sending the virtual machine address of the to-be-accelerated data and the length of the to-be-accelerated data.

2. The method of claim 1, wherein the information required to perform the acceleration operation further comprises a virtual machine physical address used to store an acceleration result.

3. The method of claim 1, wherein the virtual machine address of the to-be-accelerated data is a virtual machine physical address of the to-be-accelerated data, and wherein the method further comprises determining a host physical address of the to-be-accelerated data according to the virtual machine physical address of the to-be-accelerated data and a preset mapping relationship between the virtual machine physical address and the host physical address, and wherein sending the virtual machine address of the to-be-accelerated data to the hardware accelerator comprises sending the host physical address of the to-be-accelerated data to the hardware accelerator.

4. The method of claim 3, wherein the hardware accelerator supports a plurality of virtual functions (VFs), wherein, after the determining the host physical address of the to-be-accelerated data, the method further comprises querying, from a preset binding relationship between a virtual accelerator and a VF, a target VF bound to the target virtual accelerator, and wherein sending the host physical address of the to-be-accelerated data to the hardware accelerator comprises sending the host physical address of the to-be-accelerated data to the target VF.

5. The method of claim 4, further comprising adding an identifier to the Vring of the target virtual accelerator according to an identifier of the target virtual accelerator in the binding relationship after the to-be-accelerated data undergoes acceleration processing.

6. The method of claim 4, further comprising:
    selecting an unused target VF from the plurality of VFs; and
    establishing a binding relationship between the target virtual accelerator and the target VF.

7. The method of claim 3, wherein before sending the host physical address of the to-be-accelerated data to the hardware accelerator, the method further comprises recording an identifier of the target virtual accelerator.

8. The method of claim 7, further comprising adding an identifier to the Vring of the target virtual accelerator according to the recorded identifier of the target virtual accelerator after the to-be-accelerated data undergoes acceleration processing.

9. The method of claim 1, wherein the virtual machine address of the to-be-accelerated data is a virtual machine physical address of the to-be-accelerated data, and wherein the method further comprises:
    determining a host virtual address of the to-be-accelerated data in a virtual machine memory according to the virtual machine physical address of the to-be-accelerated data and a preset mapping relationship between the virtual machine physical address and the host virtual address;
    copying the to-be-accelerated data to a host memory buffer according to the host virtual address of the to-be-accelerated data in the virtual machine memory; and
    determining a host physical address of the to-be-accelerated data in the host memory buffer according to a host virtual address of the to-be-accelerated data in the host memory buffer and a preset mapping relationship between the host virtual address and the host physical address.

10. The method of claim 9, further comprising:
    copying the generated acceleration result to the virtual machine memory after the to-be-accelerated data undergoes acceleration processing; and
    adding an identifier to the virtual input/output ring Vring of the target virtual accelerator according to an identifier of the target virtual accelerator.

11. The method of claim 5, wherein after adding the identifier to the Vring of the target virtual accelerator, the method further comprises sending an interrupt request carrying the identifier of the target virtual accelerator to the virtual machine corresponding to the target virtual accelerator, to trigger the virtual machine to query the identifier in the Vring of the target virtual accelerator according to the identifier of the target virtual accelerator and obtain the acceleration result generated after the to-be-accelerated data undergoes acceleration processing.

12. A computer, comprising:
a memory configured to store instructions;
a hardware accelerator; and
a processor coupled to the memory and the hardware accelerator, wherein the processor is configured to execute the instructions, which causes the processor to be configured to:
  obtain information required to perform an acceleration operation in a virtual input/output ring (Vring) of a target virtual accelerator, wherein the information required to perform the acceleration operation comprises a virtual machine address of to-be-accelerated data and a length of the to-be-accelerated data, wherein the Vring of the target virtual accelerator includes three tables:
    a vring_desc table comprising entries that store information required to perform the acceleration operation;
    a vring_avail table specifying entries that are available in the vring_desc table; and
    a vring_used table specifying entries in the vring_desc table that have already been delivered to hardware, wherein at least the virtual machine address of to-be-accelerated data and the length of the to-be-accelerated data are encapsulated using a predefined data structure, and wherein the predefined data structure occupies only one entry of the vring_desc table; and
  send the virtual machine address of the to-be-accelerated data and the length of the to-be-accelerated data to the hardware accelerator,
wherein the hardware accelerator is configured to:
  obtain the virtual machine address of the to-be-accelerated data and the length of the to-be-accelerated data and
  perform the acceleration operation on the to-be-accelerated data.

13. The computer of claim 12, wherein the information required to perform the acceleration operation further comprises a virtual machine physical address for storing an acceleration result.

14. A non-transitory computer readable medium configured to store a computer program product comprising computer executable instructions that, when executed by a processor of a device hardware accelerator, cause the processor to:
  obtain information required to perform an acceleration operation in a virtual input/output ring (Vring) of a target virtual accelerator, wherein the information required for performing the acceleration operation comprises a virtual machine address of to-be-accelerated data and a length of the to-be-accelerated data, wherein the Vring of the target virtual accelerator includes three tables:
    a vring_desc table comprising that store information required to perform the acceleration operation;
    a vring_avail table specifying entries that are available in the vring_desc table; and
    a vring_used table specifying entries in the vring_desc table that have already been delivered to hardware, wherein at least the virtual machine address of to-be-accelerated data and the length of the to-be-accelerated data are encapsulated using a predefined data structure, and wherein the predefined data structure occupies only one entry of the vring_desc table; and
  send the virtual machine address of to-be-accelerated data and the length of the to-be-accelerated data.

15. The computer of claim 12, wherein the virtual machine address of the to-be-accelerated data is a virtual machine physical address of the to-be-accelerated data, and wherein the instructions further cause the processor to be configured to determine a host physical address of the to-be-accelerated data according to the virtual machine physical address of the to-be-accelerated data and a preset mapping relationship between the virtual machine physical address and the host physical address.

16. The computer of claim 15, wherein the instructions further cause the processor to be configured to send the host physical address of the to-be-accelerated data to the hardware accelerator.

17. The computer of claim 15, wherein the instructions further cause the processor to be configured to:
  copy the to-be-accelerated data to a host memory buffer according to the host virtual address of the to-be-accelerated data in the virtual machine memory; and
  determine a host physical address of the to-be-accelerated data in the host memory buffer according to a host virtual address of the to-be-accelerated data in the host memory buffer and a preset mapping relationship between the host virtual address and the host physical address.

18. The non-transitory computer readable medium of claim 14, wherein the information required to perform the acceleration operation further comprises a virtual machine physical address for storing an acceleration result.

19. The non-transitory computer readable medium of claim 14, wherein the virtual machine address of the to-be-accelerated data is a virtual machine physical address of the to-be-accelerated data, and wherein the computer executable instructions further cause the processor to determine a host physical address of the to-be-accelerated data according to the virtual machine physical address of the to-be-accelerated data and a preset mapping relationship between the virtual machine physical address and the host physical address.

20. The non-transitory computer readable medium of claim 19, wherein the computer executable instructions further cause the processor to send the host physical address of the to-be-accelerated data to the hardware accelerator.

* * * * *

UNITED STATES PATENT AND TRADEMARK OFFICE
CERTIFICATE OF CORRECTION

PATENT NO. : 11,182,190 B2  
APPLICATION NO. : 16/214551  
DATED : November 23, 2021  
INVENTOR(S) : Lei Gong Page 1 of 1

It is certified that error appears in the above-identified patent and that said Letters Patent is hereby corrected as shown below:

In the Claims

Claim 10, Column 34, Line 57: "to the virtual input/output ring Vring" should read "to the Vring"

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*